Nov. 9, 1937.　　　　E. J. BLAKE　　　2,098,910

REMOTE CONTROL SYSTEM

Filed July 26, 1933　　　3 Sheets—Sheet 1

ELI J. BLAKE
INVENTOR.

BY

ATTORNEY.

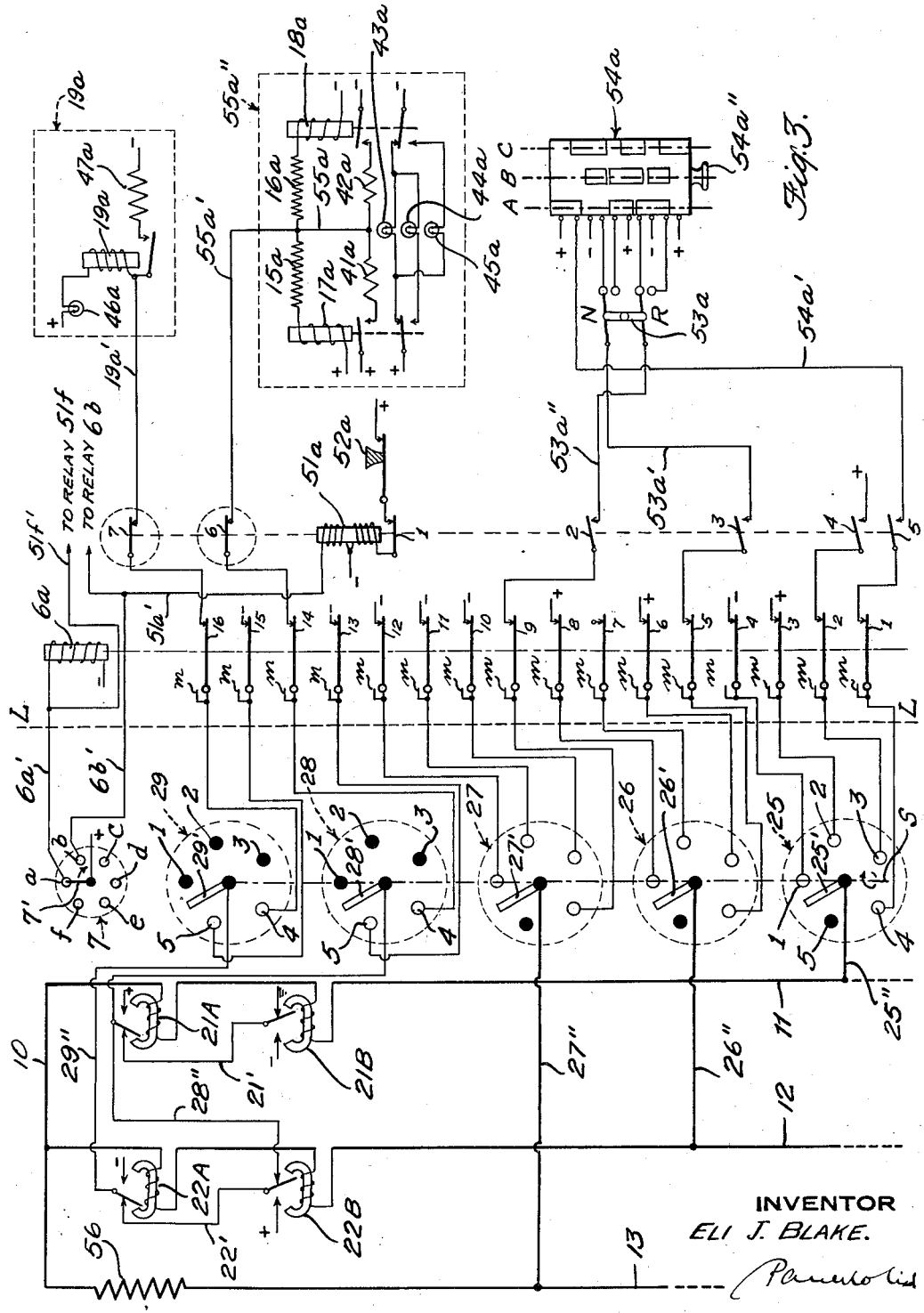

Nov. 9, 1937.  E. J. BLAKE  2,098,910
REMOTE CONTROL SYSTEM
Filed July 26, 1933  3 Sheets-Sheet 3

INVENTOR
ELI J. BLAKE.
ATTORNEY

Patented Nov. 9, 1937

2,098,910

UNITED STATES PATENT OFFICE 2,098,910

REMOTE CONTROL SYSTEM

Eli J. Blake, Haddonfield, N. J.; Elsie A. Blake, executrix of said Eli J. Blake, deceased Application July 26, 1933, Serial No. 682,229

38 Claims. (Cl. 246—3)

This invention relates to improvements in remote control and supervision of scattered electrically operated units from a single control station, and more specifically to so-called centralized traffic control systems in which the control of railway switches and signals distributed over an extensive territory is centralized at one point and operated by one man, and in which supervisory indications or reports of switch and signal positions and of the occupancy of certain track sections are transmitted to the operator for his guidance in regulating train movements through the territory.

The functional requirements for such a system are similar in many respects to the requirements for supervisory control of power stations, and some of the features of the invention are applicable to such systems, but they differ in that the controlled units involved in centralized traffic control are commonly comprised in a large number of small groups scattered along a railway for a distance of many miles. Line circuits involved in such a system are long and of relatively high resistance. Under these conditions economy dictates that control and supervision be accomplished with very few line conductors and with devices adapted to operate on the small amounts of energy which it is practicable to transmit over lines of relatively high resistance. Furthermore, a large number of trains may be moving simultaneously through the district controlled by the system. Prompt despatching of all trains may require transmission of control impulses and receipt of reports from the substations in rapid succession. Consequently rapid operation of the system is essential. Since the units to be controlled are widely scattered and unattended except for periodic inspection and maintenance, it is essential that only devices of the utmost reliability be involved in the system.

Comprehension of my whole system and of the description below of the detailed operation of several embodiments will be facilitated by a general functional outline of my operating plan and of the characteristic impulses and calls or codes of those impulses that I use.

General functional outline

In a copending application, Serial No. 559,671, filed August 27, 1931, by Blake and Adams, methods are disclosed for transmitting all necessary control and supervisory information over a single line conductor with either ground or metallic return by the use of time channels set up on the line by independently timed synchronous switches at the control station and at the locations of controlled units. The present application discloses methods of accomplishing the same ends which involve independently timed synchronous or time channel operation only in a very rudimentary form, or not at all in certain embodiments, but which require three or more line conductors.

The present invention is applied to a control station and controlled units distributed at a number of substations along the railway. At a typical substation there will be one power operated track switch, a group of semaphores or trackside signals governing train movements, and one or more track relays indicating occupancy or non-occupancy of certain track sections or blocks. Some substations will have only signals and track relays, or other combinations. Three line conductors, common to all stations, connect the control station to the substations in my preferred structure and transmit all necessary communications from the control station to the substations and vice versa. Signals are transmitted from the control station and others are received by the control station. The signals consist of characteristic impulses, and usually of two or more successive impulses. Each impulse comprises distinctive combinations of positive and negative potential impressed upon two or all of the three line conductors. Twelve such combinations or distinctive impulses exist—see table below. Energy for outward impulses from the control station is derived from a battery at the control station. Energy for the inward impulses to the control station is supplied by local batteries at the substations of origin, and preferably by the same batteries which supply local energy for operating track switches and trackside signals. The following table gives the 12 different characteristic impulses, and an arbitrary numbering of them for convenient reference. Upward flow in lines 1, 2, 3 will be called plus current and downward flow minus current. The reason for this convention is more fully discussed below.

| Impulse | #1 | #2 | #3 | #4 | #5 | #6 | #7 | #8 | #9 | #10 | #11 | #12 |
|---------|----|----|----|----|----|----|----|----|----|----|----|----|
| Line 1 | + | + | + | − | − | − | + | + | 0 | 0 | − | − |
| Line 2 | − | − | 0 | + | + | 0 | + | 0 | + | − | 0 | − |
| Line 3 | + | 0 | − | + | 0 | − | − | − | − | + | + | + |

Obviously each usable impulse must involve at least one + line connection and one −; i. e. such combinations as +++, or +0+, or — — 0, do not complete a circuit and cannot be used.

Apparatus at the control station is arranged to send out automatically a repeated program of signals or calls composed of successive impulses, for selecting or making connection to each substation in turn. Each substation responds, of course, to a different signal. During this automatic program, if the dispatcher requires no change of track switch and trackside signal positions, each substation, when so "called", responds automatically with a report signal giving an indication at the control station of the position of its track switch, and trackside signal group and track relays. Thus all signals, both outward and inward, are really initiated at the control station in a recurrent program. Because the substation sends no inward signal except when "called" the possibility of conflicting signals initiated at different points does not arise. Hence there is no need for the complex apparatus provided in some existing centralized traffic control systems for testing the lines for conflicting signals and, if necessary, for forcing report signals to await the transmission of already initiated control signals or vice versa.

Since report signals originate at the substations and only as they are "called" by the control station, the need for up-to-the-instant supervisory information by the dispatcher requires that each substation be "called" at very frequent intervals. This is accomplished first by restricting the total code transmitted to and from each substation (calling signal plus responsive report signal) to five successive impulses, and second, by employing only apparatus adapted for very rapid operation. Similar apparatus used in commercial printing telegraph circuits is regularly operated at rates of forty impulses or more per second, and all the elements of the present invention are adapted to equal or greater speed. Hence, eight or more substations per second can be scanned for reports. This permits completing the whole program in a few seconds (e. g. in ten seconds for a system of 80 substations) and closely approximates a continuous view by the dispatcher of the position of all supervised units.

If the dispatcher, however, desires instant control of or report from one particular substation, he may interrupt the automatic program, advance a call transmitter to call the desired substation, and send at once a control signal or receive a report signal. Thereafter the automatic program resumes at that point. Normally, however, if a matter of ten seconds is not vital, when the dispatcher desires to make a change in the track switch and trackside signal set-up at some substation, he merely sets to agree with the desired set-up certain control keys that correspond to the substation wanted, and then presses a control button. At the next automatic recurrence of the call for that substation, (i. e. some time within ten seconds on an 80 substation system) the call will be so modified that the substation receiver will suppress, for that particular cycle, the transmission of its report signal and will instead adapt itself to receive a control signal, (automatically sent right after the call), and to initiate the desired change in the track switch and trackside signals. At the conclusion of such a control signal the transmitter at the control station is automatically restored to normal and the automatic program of scanning for reports is resumed.

Signal detectors at control station and substations may either be series devices responsive to current in the line conductors, or bridging devices responsive to potential differences between line conductors. In the former or series arrangement my primary receiving element is a group of polar relays in series in the control lines, selectively responsive to the polarity of any current flowing in the lines. Local relays controlled by these line relays respond to specific ones of the 12 impulses also to specific sequences of such impulses, in such a way as to establish different local circuits according to the signal received. In the latter or bridging arrangement high resistance polar relays, or an electronic equivalent, are connected across the different pairs of line conductors, to control the local relays in a manner essentially similar.

The signaling cycle for each substation comprises a definite number of impulse periods. To fix the ideas let us here consider a particular embodiment to be described below in which the signaling cycle for each substation consists of 5 impulse periods. The successive groups of five periods follow one another without intermission, and it is therefore necessary to distinguish between the impulses of successive groups. There might otherwise be false response by one substation receiver to a hybrid group composed of impulses intended for two other receivers. For example, if we have a series of ten impulses, $a, b, c, d, e, f, g, h, i, j$, and if the first five ($a\ b\ c\ d\ e$) are a signal to substation No. 1 and the remainder a signal to substation No. 2, it is necessary to insure that no hybrid group of five impulses such as $d\ e\ f\ g\ h$ will be improperly accepted as a signal by some other substation. For this reason certain impulse combinations are set aside as markers or impulse group starting impulses, and the substation receivers are organized to respond only to groups of successive impulses initiated by a marker impulse.

As previously mentioned and shown in the table above there are twelve usable combinations of positive and negative currents or potentials among three conductors. It will be noted in the table that the first six combinations either have + on line 1 with — on line 2, or vice versa, whatever may be on line 3, i. e., lines 1 and 2 are both alive and of opposite polarity. These six are all the combinations in which lines 1 and 2, alone, constitute a complete circuit, whether line 3 is or is not used. As a matter of structural convenience as will later be understood these six combinations are the ones used as markers.

In each of the other six combinations, numbers 7 to 12 in the table, the current in conductor 3 is a necessary consequence of the currents in conductors 1 and 2. For example, in No. 7, with positive current in both conductors 1 and 2 the return current in conductor 3 is necessarily negative. With — in line 1 and with line 2 dead, (No. 11), the return current in line 3 must necessarily be +, etc. It follows that these six combinations, 7 to 12, are fully defined by the condition of conductors 1 and 2 only, i. e. by whether there is a plus current or minus current or no current in each. Use is made of this property, as will later appear.

As stated, the first, or marker, impulse for each signal is chosen from the first six combinations tabulated. This impulse, plus a second and a third impulse selected out of Nos. 7 to 12, constitutes the substation "call". Since we have six options in each of three successive impulses we have available a total of 6×6×6=216 different substation calls. In one embodiment hereafter described, however, it will be seen that it is necessary to avoid all repetition of identical impulses in the substation call. Hence in this embodiment, when one of impulses Nos. 7 to 12 has been chosen for the second impulse, only five choices remain available for the third impulse. Hence the total substation calls available in this embodiment are 6×6×5=180.

Of the available substation calls, whether there are 216 or 180, two are assigned to each substation. One is used to call a given substation when we wish that substation to send in a report signal. The other is used when we wish to set up the substation receiver for response to a control signal from the control station. Thus with the system to be described we can either call for supervision or call for control, a total of 216÷2=108 substations; or in that embodiment mentioned just above we can call a total of 180÷2=90 substations.

When the "supervisory call" of a given substation is sent, it causes a transmitter there to send in impulses that are indications of the conditions of track switch, trackside signals and track relays. These reports or indications sent from the substation comprise two impulses right after the three substation calling impulses. These report impulses, like the 2nd and 3rd calling impulses, are chosen out of the six impulses Nos. 7–12. Impulses Nos. 1 to 6, are used only, it will be remembered as first or marker impulses. Two report impulses, of which each is chosen out of six possible ones give us 6×6=36 available signals, which are just sufficient as shown below to transmit to the central office the information as to the positions of one track switch, one trackside signal group and two track relays. At some substations, having no track switches or trackside signals, only track indications are desired. The code described will indicate at central in such cases the position of five track relays.

Three different track switch conditions are possible viz: "normal", "reversed" and "unlocked". Three conditions are possible for a group of trackside signals, viz: "clear for westbound", "clear for eastbound" and "stop". Two conditions viz: "picked up" or "released", are possible for each track relay. The number of possible different combinations of these apparatus conditions is therefore 3×3×2×2=36, or the same as the available different signals. In the case of a substation having only track relays we can supervise as many as five, for which we require 2×2×2×2×2=32 combined signals.

If we send out the "control call", instead of the "supervisory call", of a given substation, the receiver at that substation is thereby set up to receive a fourth impulse from the control station, which determines the desired set-up for track switch and trackside signals. The track switch may be desired at either "normal" or "reverse". The trackside signals may be desired set to "clear eastbound", "clear westbound" or "stop". There are thus 2×3=6 possible combinations of controls to execute. The control impulse sent is chosen among the six impulse combinations, Numbers 7 to 12 of the table, according to the combined track switch and trackside signal set-up that is desired. When a control call is sent, the fifth impulse period, used in the supervisory code as just described, is left blank.

Many variations of the operation plan and code arrangements above outlined will occur to those skilled in the art, notably the following: Instead of positive and negative direct currents impressed on the conductors, we may use any two kinds of current, such as direct and alternating current, two alternating currents of different frequencies, different superposed frequencies, or pulsating currents of various characteristics. The essential point is that we must have (with such practical restrictions as the necessity of providing a return path for the currents), at least two current options, other than zero, available for each conductor.

If more than two current options or more than three conductors are available, the possible combinations constituting different impulses will be much more than twelve. If, for example, many substations are concentrated within a limited region it may be economical to utilize a variant using more line conductors and less impulses per signal. For example, instead of the twelve combinations possible on three conductors as per table, four line conductors permit fifty usable combinations of positive and negative currents in one impulse. If fourteen of these combinations are set aside solely for first or marker impulses, there remain 36 others; thus groups of two impulses will give a total of 14×36=504 possibilities sufficient for six different calls for each of 84 substations. Thus all necessary call and control signals in a 4 wire system according to my invention can be conveyed in two impulses. One third impulse will provide the needed thirty-six different kinds of responsive report signals. Thus by adding one wire the number of impulses per substation reduces from five to three, and the supervisory program is greatly speeded up.

In another operating variant I do away with the automatic cyclic supervision of the condition of all R. R. apparatus that is controlled by the dispatcher, i. e. track-switches and trackside signals—retaining automatic cyclic supervision of only the track relays, because these latter, as the trains move, will change their condition independently of the dispatcher. Where this practice is judged satisfactory, and using a 3 conductor line, the report signal from the substation, which follows the supervisory call of three impulses, needs only one impulse instead of two,—because two track relays can have only four different combined conditions and there are available for this purpose six different kinds of impulse—Nos. 7 to 12 of the table. This operating variant cuts the total code per substation from five impulse times to four, and makes the automatic supervisory program that much swifter. In this case the supervision of track-switch and track signals is maintained as follows: when the control call of a substation is sent, followed by the one control impulse as outlined above, the automatic supervisory program is suspended until the track switch and trackside signal have changed position in accordance with the control impulse sent. Then there originates at the substation a report signal indicating the completion of the changes ordered, which gives in front of the dispatcher an indication of the new position of the controlled trackside apparatus. The automatic program of recurrent supervisory calls for track relay condition then resumes.

In still another modification of my operating plan two substations may be arranged to answer the same supervisory call, and then each in turn to send in its report signal of two impulses, just as first outlined. This saves the supervisory call of every second substation, i. e., it cuts the total code for two substations, in the automatic program, from ten impulses to seven. In this plan, there is an individual control call per substation followed by one control impulse, the combination determining one of six combined track switch and trackside signal conditions, all as outlined first. Since there are 216 different calls and since in this variant plan there are needed for every two substations two control calls but only one supervisory call, or 1½ calls per substation, it is evident that instead of 108 substations as many as 216÷1½=144 substations can be handled.

Other modifications of my preferred use of codes and operating plan may be made by separating or distinguishing from each other the codes or groups of signals intended for individual substations by a mere pause or time lapse, instead of by specially set aside marker impulses. These modifications give the option of all twelve impulses for every purpose. Thus, using a pause between codes, only two impulses, each of which may be any one of the twelve, would give 12×12=144 different calls. The pause, however, must consume about as much time as one more impulse.

Still other modifications are practical using more or less than the first outlined number of six marker impulses.

In other variants the calling codes may be restricted entirely to the use of the marker impulses. In which case if, as before, we use the first six combinations of the impulse table as markers, 6×6×6=216 would still be the number of calls. In that case the control and report signals would use, as before, only the other combinations.

*Description*

Referring to the accompanying drawings, Fig. 1 shows schematically three line conductors with series line circuits, and their relation to the control station and substations, and indicates typical resistance values for certain elements;

Fig. 3 shows in detail the apparatus and connections at the control station according to one embodiment of the invention;

The same reference numerals are applied in all drawings to elements which are identical or functionally equivalent.

Before describing the local circuits and operation in detail we may first consider the line circuit and the basic signaling conditions over the three lines of my preferred structure, with both serial and bridging arrangements of line relays and with particular reference to the adequacy of the signaling energy.

Figure 1:
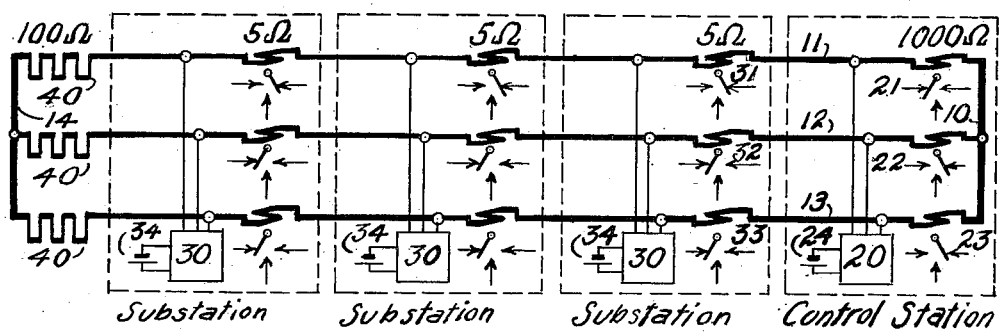

Fig. 1 shows the serial arrangement of line relays in three lines 11, 12, and 13 extending from a control station through a long series of substations, of which three are illustrated. At the control station the three lines are joined in Y as by a bus connection 10. At the remote end they are Y connected through resistors 40 to another common point, such as bus 14, so that they constitute a three-wire circuit Y-connected at both ends. Between bus connections 10 and 14 each line passes serially through one of polar relays 21, 22, 23 at the control station and through one of polar relays 31, 32, 33 at each substation. All of these relays are biased to close a central contact when deenergized, a right-hand contact when energized by positive current, and a left-hand contact when energized by negative current. Thus each relay is adapted to close three distinctive local circuits according as the current through its winding and the associated line circuit is zero, positive or negative. The three line relays 21, 22 and 23, together with local apparatus and connections not shown in Fig. 1 constitute the receiver at the control station for report signals transmitted from the substations. In like manner the three line relays 31, 32, and 33 at each substation, together with associated local elements, constitute the substation receiver for calls and control signals transmitted from the control station.

Branch circuits connect the lines 11, 12, and 13 to a transmitter 20 at the control station which establishes suitable connections at certain times to the positive and negative poles of battery 24 for transmitting call and control signals; and similar branch circuits at each substation connect the lines to a transmitter 30 which establishes connections to the terminals of a local battery 34 for transmitting supervisory signals. Transmitters 20 and 30 are merely indicated in Fig. 1 to convey their functional relation to the line circuit. They are shown in detail in Figs. 3 and 3a.

In an actual application the control lines 11, 12, and 13 may extend a hundred miles or more and may have a resistance of 500 ohms per conductor, exclusive of relays. Each line may include one hundred substation relays in addition to one control station relay and a terminating resistor at the remote end. As indicated in Fig. 1, I prefer to wind the control station relays for about 1000 ohms and the substation relays for about 5 ohms, and to use terminating resistors of about 100 ohms. The control station battery 24 may have a potential of 200 volts. Under these conditions, if the transmitter 20 connects battery 24 between lines 11 and 12, current will divide two ways. One portion, flowing through the 1000 ohm coils of control station relays 21 and 22 and the adjoining bus connection, constitutes a slight drain on the battery but serves no useful function in transmitting signals to the substations. The other portion, flowing to the left in Fig. 1, will traverse two line conductors of some 500 ohms each, two hundred of the 5-ohm relays and two 100-ohm resistors, a total of some 2200 ohms. Under these conditions the line current will be about 0.09 ampere and the energy available to operate each substation line relay will be 0.04 watt, which is ample for operating a moderately sensitive polar relay.

The batteries 34 at the substations transmit report signals to central. They may be the same that supply local energy to operate the track switches and trackside signals. The usual substation batteries for the latter purposes have a potential of the order of 20 volts. When this voltage is applied between conductors 11 and 12 at the most remote substation a small useless current will flow through two of the 100 ohm resistors 40 and the bus connection 14. Signaling current will flow to the right through two line conductors, two hundred 5-ohm relays and two 1000-ohm relays. The aggregate circuit resistance is 4000 ohms, the current 0.005 ampere, and the energy expended in each control station relay 21 or 22, 0.025 watt, which is ample. The energy expended in each substation relay is very small, but as will be later seen it is immaterial whether these relays respond to the report impulses or not.

In certain cases (impulses Nos. 1, 3, 4, 6, 7, and 12 of the table above) signaling current will flow out through one line conductor and back through the other two conductors in multiple, or vice versa. In these cases the current in each of the two conductors in multiple will be less than for the above simpler case, but will still be ample for operating suitable relays.

Figure 2:
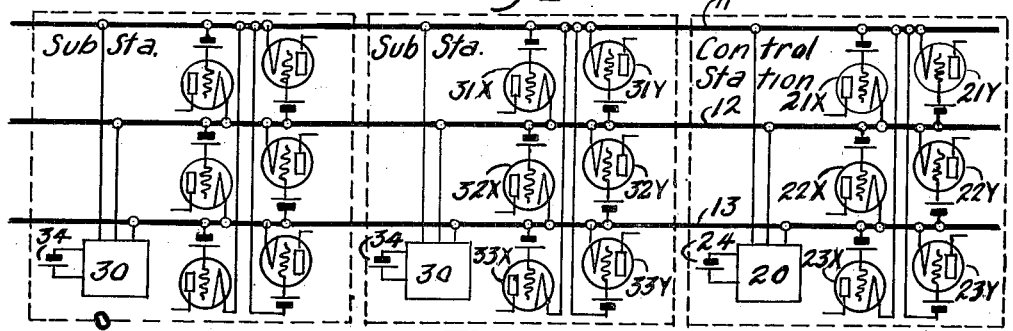
Fig. 2 shows schematically multiple line circuits operatively equivalent to the series circuits of Fig. 1.

Fig. 2 shows schematically the multiple connected or bridging equivalent of the series system illustrated in Fig. 1. One control station and two of the many substations are illustrated. As in Fig. 1 the lines extend through the control station and each substation, but are not joined at their ends by busses 10 and 14 as in Fig. 1. Transmitters 20 and 30 and batteries 24 and 34 are functionally the same as in Fig. 1, although much lower battery voltages may be employed. In place of each of the relays 21, 22 and 23, and 31, 32 and 33 of Fig. 1 serially connected in the three lines there are at the control station and at each substation a pair of electronic relays such as 21X, 21Y connected between each pair of line wires. There are thus at each station three such pairs delta connected between the line wires. Since this is purely descriptive of line conditions the local circuits in the plate circuits of the electronic relays are omitted. A source of alternating current, not shown in this diagram, is required at each station for energizing the plate circuits of the electronic relays.

Since all the pairs of electronic relays, 21X and 21Y, 22X and 22Y, 23X and 23Y, 31X and 31Y, 32X and 32Y, 33X and 33Y are connected alike between their respective line wires it will suffice to describe the operation of one. The grid of relay 21X and the filament of relay 21Y are connected to line 11, while the filament of relay 21x and the grid of relay 21y are connected to line 12. A suitable grid bias battery is included in each grid connection. With this arrangement three conditions equivalent (though not identical) to the three positions of polar relay 21 (Fig. 1) may be established in the local plate circuits controlled by electronic relays 21x and 21y: (1) if line 11 is positive with respect to line 12, thus establishing a positive relative potential on the grid of relay 21x, pulsating current will flow in the plate circuit of that relay while current in the plate circuit of relay 21y will be blocked by negative potential on its grid; (2) if line 11 is negative with respect to line 12, current will be blocked in the plate circuit of relay 21x but will flow in the plate circuit of relay 21y; (3) if lines 11 and 12 are at the same potential, the negative potential maintained by the bias battery in each grid circuit will block the flow of current in the corresponding plate circuit. Thus, in place of three local circuits closed selectively in accordance with current flowing in line 11, as in Fig. 1, we have two local circuits closed or not closed selectively in accordance with potential difference between lines 11 and 12; but in either case we have three distinctive responses in the local circuits, according as current or potential is positive, negative or zero. In Fig. 2, these three local conditions are: (1) flow in plate circuit of relay 21x; (2) flow in plate circuit of relay 21y; and (3) both plate circuits blocked.

While I have shown and described below only such local circuits as are suited to cooperate with the three position series line relays of Fig. 1, which is my preferred line arrangement, it will be readily understood by those skilled in the art how these local circuits may be modified to perform identically under control of the three plate circuit conditions mentioned.

Within certain limitations as to line resistance and number of associated substations it is feasible to replace each pair of electronic relays in Fig. 2 with a three-position polar relay like those shown in Fig. 1, except that the relays should be wound for high resistance. The required resistance of the polar line relays becomes prohibitively high, however, when the lines are very long and the substations very numerous; for example, under the same conditions as the numerical case previously discussed for series line relays, the optimum resistance value for delta connected polar relays would be about 80,000 ohms. This arrangement, however, becomes practical for small systems.

In the multiple connected line circuit arrangement of Fig. 2 it may be noted that, while the number of different combinations of positive and negative potentials on lines 11, 12, and 13 are the same as in the series arrangement of Fig. 1, the particular combinations for any given relay response are different. In other words the correspondence of line potential combinations and relay response combinations is different. Thus, in Fig. 1, + on line 11 and − on line 12 puts relay 31 on its right hand contact, relay 32 on its left hand contact, and relay 33 on its central contact. A logically corresponding relay response in the Fig. 2 structure would be flow in plate circuit of electronic relay 31x, (31y blocked), flow in plate circuit of relay 32y (32x blocked) and relays 33x and 33y both blocked. But the arrangement of battery potentials on the three lines necessary to get this corresponding result is + on both lines 11 and 13 and − on line 12 instead of + on line 11 and − on line 12. The following tabular arrangement shows the correspondence of the potential differences across the three delta connections with the twelve line potential combinations of the original impulse table. The potential differences are taken in the direction stated, e. g., for combination #1 the potential difference line 1 to line 2 is given as negative, meaning that the potential falls when going from line 1 to line 2, or that line 1 is at the higher potential. This tabular arrangement is shown to facilitate the practice of my invention by those preferring the branching line circuit.

| Impulses | 1 | 2 | 3 | 4 | 5 | 6 | 7 | 8 | 9 | 10 | 11 | 12 |
|---|---|---|---|---|---|---|---|---|---|---|---|---|
| Line current (series): | | | | | | | | | | | | |
| Line 1 | + | + | + | − | − | − | + | + | 0 | 0 | − | − |
| Line 2 | − | − | − | + | + | + | 0 | + | + | 0 | + | 0 |
| Line 3 | + | 0 | − | + | 0 | − | − | − | − | + | + | + |
| Potential difference (bridging): | | | | | | | | | | | | |
| Line 1 to 2 | − | − | − | + | + | + | + | 0 | − | + | − | 0 |
| Line 2 to 3 | + | + | 0 | 0 | − | − | 0 | − | + | + | + | + |
| Line 3 to 1 | 0 | + | + | − | − | 0 | + | + | + | − | − | − |

Figure 3A:
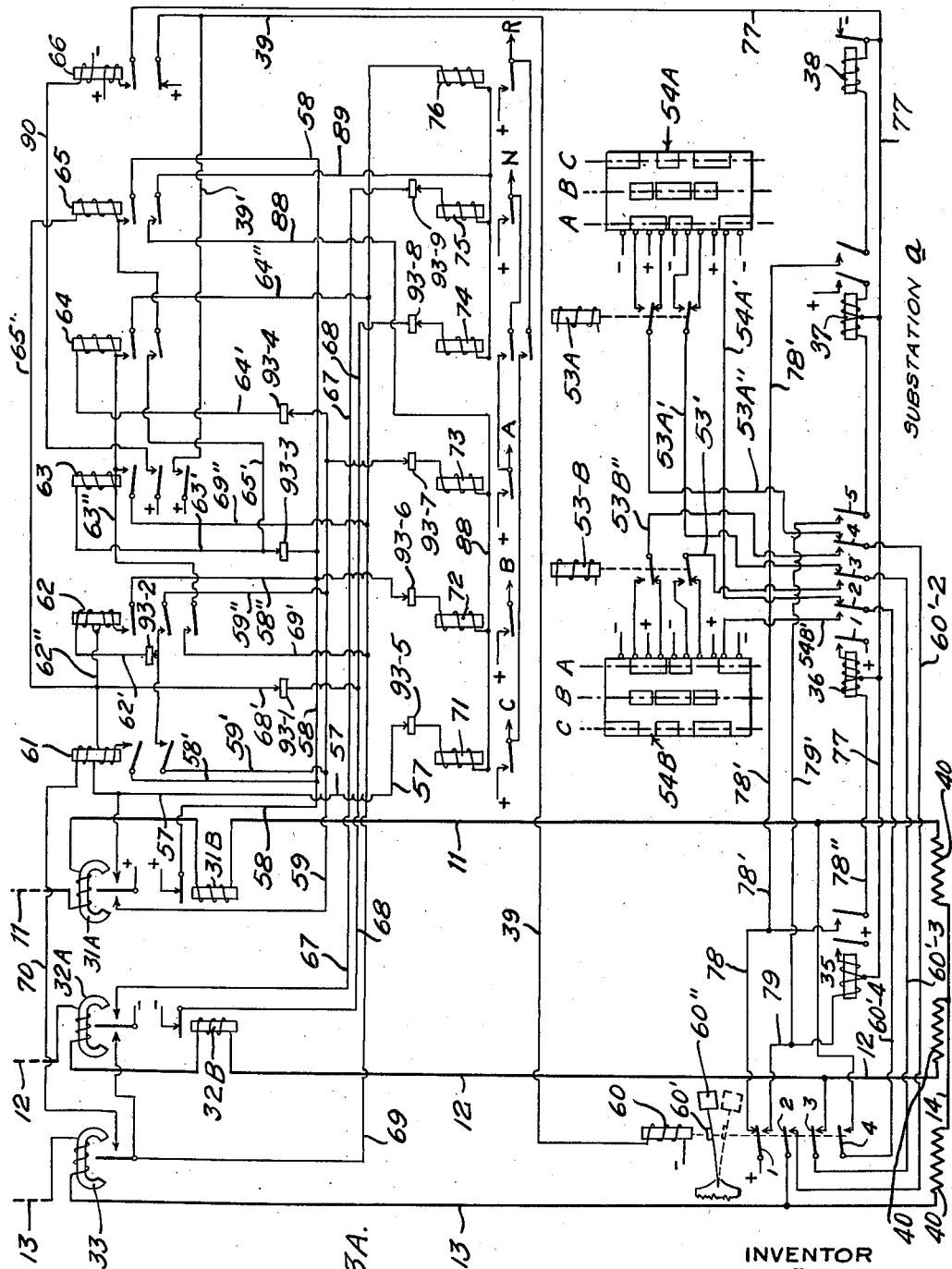
Fig. 3a shows in detail the connections and apparatus at a substation, cooperative with Fig. 3.

*Operation.*—Fig. 3 shows in detail the apparatus and connections at the control station, using 3 line conductors and the series line relay arrangement. This figure is arranged to be juxtaposed with Fig. 3a with lines 11, 12, and 13 matching on both figures, the whole forming an exemplification of a cooperative control station and substation joined only by three line wires.

*Control station.*—The operation of the control station Fig. 3 will first be described, the cooperative functioning of the substation Fig. 3a being at first merely assumed. The cooperation of the substation will then be described.

The apparatus and connections to the left of broken line L—L in Fig. 3 are common, i. e., required in cooperation with any substation, and are not duplicated. Practically all of the apparatus and elements and connections to the right of L—L are individual, i. e., one such set is required for every cooperative substation. The reference numerals of all parts of the apparatus and elements individual to substations bear small letter suffixes (a, b, . . . f) corresponding both to designations of the substations they serve and to the positions or contacts 1a, 1b . . . etc., of common dial switch 1; which latter switch by its position determines with which substation communication is being held, as will be seen. The substation shown in Fig. 3a, and to which the most of the individual apparatus and parts shown in Fig. 3 corresponds, is the one I have designated a.

There are four phases of the control station operation to be described:

(1) The cyclic automatic transmission on lines 11, 12, and 13 of supervisory calls for each substation in succession. It will be remembered that these calls comprise three successive impulses, starting with one of impulses Nos. 1 to 6 reserved as "markers".

(2) The reception, immediately after the three outgoing supervisory call impulses, of two successive incoming or report impulses, recording on suitable indicators, such as lamps, the condition of the R. R. apparatus at the called substation.

(3) The manually initiated alteration of the next supervisory call for any given substation into the control call for that substation.

(4) The outward transmission immediately after sending the three impulses of a control call for a given substation of a manually predetermined control impulse (one of six options) to effect desired changes in R. R. apparatus at that substation.

*Phase* (1).—Dial switches 25, 26, 27, 28, and 29, respectively comprise rotating wipers 25', 26', 27', 28', and 29' and five stationary contacts each. These contacts will herein be designated by the switch numeral followed by the positional number of the contact. Thus contact 25—2 refers to contact numbered 2 in dial switch 25. Wipers 25' to 29' are fixed on a common shaft S. Any well known driving means of reasonably constant speed drives shaft S at a speed which may be of the order of 8 revolutions per second or 480 R. P. M. As will be seen later the speed of this shaft determines the length of the various impulses, and the operating and releasing times of certain substation relays must be in reasonable accord with the impulse length.

Dial switch 7 is arranged by suitable well known mechanical means not shown such as a pawl and ratchet operated by a cam on shaft 5, to step its wiper 7' one step forward for each revolution of shaft S. This step takes place as wipers 25' to 29' leave contacts 25—5 to 29—5. While dial switch 7 is shown for simple illustration with only six contacts, a to f, it must be understood that it has one contact for every cooperating substation on lines 11, 12, and 13, which may be a considerable number. There is at the control station a battery 24, shown in Fig. 1. As stated above in connection with Fig. 1, battery 24 may have 200 volts. A connection is made to its mid-point, which point may be, but is not necessarily, grounded. To avoid multiplicity of lines in Figs. 3 and 3a all contacts and wires to which there is a permanent battery connection bear a +, a − or a ground symbol to denote connection respectively to the positive or negative poles or to the mid-point of a local battery. It will be understood that in Fig. 3a the + and − symbols represent permanent connections of the substation battery, which is battery 34 (see Fig. 1) of lower voltage than the control station battery 24.

Wiper 7', as indicated by the + sign, is connected to the positive pole of battery 24, and is shown resting on contact 7—a. A wire 6a' leads from contact 7—a through the coil of a relay 6a to the negative pole of the battery. This operates relay 6a which has sixteen "front" contacts, numbered from the bottom up and designated as contacts 6a—1 to 6a—16. Relay 6a is shown in its operated position. It shortly will be seen that relay 6a, by means of the particular +, − and dead connections of its contacts, determines the sequence of impulses that will be put on lines 11, 12, and 13 by dial switches 25, 26, and 27. In other words relay 6a embodies in its contact connections the supervisory call for substation a. It will be understood that relays 6b, 6c, etc., just like 6a except having different battery connections on their fixed contacts and thus embodying each the call for a different substation, are connected respectively to contacts 7—b, 7—c . . . 7—f of switch 7. In the drawings the sixteen branch connections to contacts 6a—1, 6a—2, . . . 6a—16, designated m, —m, show where the multiple connections are made to the moving contact members of the other relays 6b, 6c, etc.

The lower twelve moving contact members 6a—1, 6a—2, . . . 6a—12, of relay 6a, are connected in that order to dial switch contacts 25—4, 25—3, 25—2, 25—1; 26—4, 26—3, 26—2, 26—1; 27—4, 27—3, 27—2, 27—1; wipers 25', 26', and 27' are connected by wires 25'', 26'', and 27'' to lines 11, 12, and 13. With relay 6a operated, when wipers 25', 26', and 27' reach contacts 25—1, 26—1, and 27—1 it will be seen that lines 11, 12, and 13 will be connected respectively to contacts 6a—4, 6a—8, and 6a—12 of relay 6a and hence respectively to the − + and − poles of battery 24.

It is here convenient to adopt a convention as to what will be meant by + current and − current in the lines, and as to the response thereto of the polarized line relays. Current flowing upward in lines 11, 12, and 13 in Figs. 3 and 3a will be called + current in these lines, and current downward will be called − current. The various polarized line relays, 21a, 21b, 22a, 22b, 31a, 32a, and 33 in Fig. 3 and Fig. 3a, will be understood to move their armatures to the right on + current and to the left on − current, and on 0 current to resume or retain the positions actually shown. This convention is necessary because + battery potential applied to a line at one side (say above in the drawings) of a given polarized line relay will have one effect thereon, and the same potential applied to the same line at the other side (say below) of the same relay will have an opposite effect. In this connection, we have shown the control station at one end of the lines, but in practice the control station often may be in the middle of the group of substations it controls. It is thus evident that, in the series line arrangement, the twelve characteristic impulses must be described, not by the potentials placed on the lines, but by the currents resulting in the lines.

The connections just traced, of − battery to lines 11 and 13 and + battery to line 12, result in current upward in lines 11 and 13 and downward in line 12, which by the convention and for operation of the line relays is called + on line 11, − on line 12 and + on line 13. By reference to the basic impulse table hereinbefore shown this is seen to be impulse No. 1, . . . one of the six option reserved for "marker" or first-of-group impulses. It must here be assumed, to be elucidated, that all substations require one of these "marker" impulses to be able to start to respond to a call, and that only certain ones (in a full system, only one out of every six substations) will start on this particular marker impulse.

Now as shaft S turns farther, wipers 25′, 26′, 27′ leave contacts 25—1, 26—1, 27—1 respectively, and after a brief period of no connection pass onto contacts 25—2, 26—2, 27—2 which, since relay 6a is still operated, connect lines 11, 12, and 13 respectively to contacts 6a—3, 6a—7 and 6a—11 which are connected to +, dead, and −. By the convention, this gives as the second impulse −, 0 and + current in the lines to the substations which constitutes impulse No. 11 of the table. This is one of those reserved for all but marker uses. It must be assumed,—and will later be elucidated,—that of the substations able to start receiving the call that began with the No. 1 impulse only certain ones (not over six) will be able further to respond to this particular second impulse of the call.

As wipers 25′, 26′, 27′ pass to contacts 25—3, 26—3 and 27—3, it will be seen that lines 11, 12, and 13 are connected, respectively, to 0, + and − battery, which by the convention gives 0, −, + current in the lines to the substations. This is impulse #10 of the table. It must be assumed, to be later shown, that of the stations able to respond to both the first (marker) impulse (+ − +) and the second impulse (− 0 +) only one will respond to this particular third impulse, and that that one will respond by immediately putting on the lines a fourth and fifth impulse (both chosen out of impulses Nos. 7 to 12) reporting the condition of R. R. apparatus at that substation.

*Phase (2)*.—The two report impulses, initiated at the called substation in response to the supervisory call whose transmission on the lines was just described, occur in the fourth and fifth impulse periods, which means while wipers 25′, 26′ . . . 29′ are on contacts 25—4, 26—4 . . . 29—4 and then on contacts 25—5, 26—5 . . . 29—5. Considering first the fourth impulse period, it is understood that in this period the called and responding substation may put on each of lines 11, 12, and 13, either + battery, − battery or 0 battery, within the options offered by impulses Nos. 7–12 of the table. In this fourth period,—since we are considering now only the supervisory call and report impulses,—contacts 25—4, 26—4 and 27—4 will be found dead because their connected contacts 6a—1, 6a—5 and 6a—9 lead to open back contacts 51a—5, 51a—3 and 51a—2 of a locked-up relay 51a, whose function will later be described. Therefore dial switches 25, 26, and 27 in their fourth position cannot transmit or receive any current combination or characteristic impulse to or from lines 11, 12, and 13. This is also true in the fifth position because contacts 25—5, 26—5 and 27—5 are permanently dead.

Dial switches 28 and 29, whose contacts 28—1, 28—2, 28—3, 29—1, 29—2 and 29—3 are permanently dead—dead contacts in the dial switches are indicated for quick recognition by black circles—clearly could not send or receive line impulses until the fourth position. But in their four and fifth positions wipers 28′ and 29′ pass off these permanently dead contacts, and—it will be seen—serve to convey to the proper indicating apparatus the indications of the report impulses put on the lines by the responding substation. To trace this action as shown in Fig. 3 it is necessary to revert to the line circuit diagrammed in Fig. 1. There, for diagrammatic simplicity, single polar line relays, 21, 22, 23, 31, 32, 33, having three contact positions each were shown in lines 11, 12, and 13 at the control station and at the substations. This is a possible structure, but such three-contact polar relays require much more energy to operate than the type having only two contacts, are more expensive and less rapid. Since the R. R. signal batteries, usually available at the substations without extra cost, have relatively low voltage—batteries 34 shown in Fig. 1 it is stated may have 20 volts—the polar relays at the control station require to be especially sensitive. I therefore prefer, in practice, to replace at the control station each three-contact polar relay, like 21 or 22 of Fig. 1, with a pair of two-position and two-contact polar relays in series. These may then be of printing telegraph type and exceedingly quick, reliable and sensitive. Each such pair have their contacts so interconnected as to close three different local circuits according to whether +, − or 0 current is in the line. In line 11 relays 21A and 21B constitute such a pair. Their coils are in series. They are so biased as to assume the positions shown when no current is in their coils. They both have their armatures to the right when + current (i. e. upward current) is in line 11. They both have their armatures to the left when − (i. e. downward) current is in line 11. As shown, with 0 current, the mid-point of battery 24, represented by a ground symbol, is connected through right hand contact of 21B, through armature of 21B, wire 21′ and left contact of 21A to the armature of 21A. With + current in line 11 the armature of 21A moves to the right and connects to + pole of battery 24.

With − current in line 11 armatures of 21A and 21B will both be at the left and the − pole of battery 24 will be connected through armature of 21B, wire 21′ and left contact of 21A to the armature of 21A. Wire 28″ is connected to armature of 21A and is thus connected respectively to the midpoint, the + pole or the − pole of battery 24 according to whether 0 +, or − currents are in line 11.

In line 12 the pair of sensitive polarized two-contact relays 22A and 22B are similarly interconnected to perform the function of one three-contact relay like 22 of Fig. 1. With 0 current in line 12 the armatures will be as shown, connecting wire 28″, through right contact and armature of 22B to wire 22′, left contact and armature of 22A, to wire 29″. With + current in line 12 the armatures will both be to the right, and that of 22A thus connects wire 29″ to − battery. With −current in line 12 both armatures are to the left, connecting the + battery of the left contact of 22B, via wire 22′ and armature of 22A, to wire 29″. Thus wire 29′ is connected either to wire 28″, to − pole of to + pole of battery, according to whether current in line 12 is 0, + or −.

Wires 28″ and 29″ lead respectively to wipers 28′ and 29′ of dial switches 28 and 29. In the fourth impulse period wiper 28′ is on contact 28—4, which is connected via contact 6a—14 and wire 55a′ to junction point 55a of indicator circuit 55a″ (shown enclosed in a dotted rectangle). Wire 55a′ may, if desired be wired through a contact 51a—6, of relay 51a (shown in a dotted circle) for reasons explained below. For the present description, relay 51a being locked in operated position, contact 51a—6 (if present) is closed and may be disregarded.

Similarly wire 29″, through wiper 29′, contact 29—4, contact 6a—16 and wire 19a′ leads to the relay 19a. A closed contact 51a—7 (shown in a dotted circle) may or may not be in wire 19a′ for reasons to be disclosed. Relay 19a with resistance 47a and lamp 46a constitutes another indicator circuit shown enclosed in a dotted rectangle and designated 19a″.

Another indicator circuit exactly like 55a″ may and usually will be connected through contact 6a—13 to contact 28—5, and another indicator circuit like 19a″ may be connected through contact 6a—15 to contact 29—5. These are not shown merely to avoid complicating the drawings.

We can now consider in detail the operation of receiving a report impulse in the fourth impulse period from the called substation. It will be recalled that such an impulse must be one of Nos. 7—12. It was pointed out above, in connection with the impulse table that this group of six impulses is fully defined by the current in lines 1 and 2—or, as they are designated in Fig. 3, lines 11 and 12. The current in the third line is predictable from the currents in lines 11 and 12. It is my choice of the report impulses out of the group having this property that makes it unnecessary in the Fig. 3 structure to use any line relay or relays at the control station in line 13. Line relays are shown in all three lines of the Fig. 1 line circuit because that is a more generalized showing in which advantage was not taken of this property of certain impulses. To obtain symmetrical current distribution it is preferable to put a resistance 56 in line 13 equal to the resistance of a relay pair 21A, 21B or 22A, 22B.

Impulse numbers 7 to 12, by the property mentioned, reduce to the following six different combinations of currents (not polarities on) lines 11 and 12.

| Impulse number | 7 | 8 | 9 | 10 | 11 | 12 |
| --- | --- | --- | --- | --- | --- | --- |
| Line 11 | + | + | 0 | 0 | − | − |
| Line 12 | + | 0 | + | − | 0 | − |

Considering the battery connections of wires 28″ and 29″ when a substation responds, as it may, with any one of these impulses, we find that, the line relay circuits already traced give the following results:

| Impulse | Connection of wire 28″ | Connection of wire 29″ |
| --- | --- | --- |
| 7 | + pole | − pole |
| 8 | + pole | + pole |
| 9 | midpoint | − pole |
| 10 | midpoint | + pole |
| 11 | − pole | − pole |
| 12 | − pole | + pole |

As traced, wire 29″, in the fourth impulse period, is extended to relay 19a in indicator circuit 19a″. This circuit may for example indicate the operated or non-operated condition of one track relay. If wire 29″ is connected to the − pole of battery 24 (impulse 7, 9 or 11), relay 19a will be energized and lamp 46a in series with it will light. Once energized relay 19a closes a locking circuit by its contact through resistance 47a to − battery, and lamp 46a will remain lighted until relay 19a is again unlocked. This may signify that track relay #1 is operated. If relay 19a is once locked up, e. g. by a No. 7 report impulse from the substation in the fourth period, the next time in the cycle of dial switch 7 and of dial switches 25 to 29 that wiper 7′ is on contact 7a and that wiper 29′ is on contact 29—4 the same substation may send in the same or a different report impulse. If it is one of Nos. 7, 9 or 11 relay 19a and lamp 46a will not change, if it is one of numbers 8, 10 or 12 wire 29″ becomes + and relay 19a is shortcircuited and falls putting out lamp 46a. This may signify that track relay #1 is deenergized. This condition in turn will persist until the corresponding substation again sends in, in the fourth period one of impulse Nos. 7, 9 or 11. Thus, as regards lamp 46a there are only two kinds of report impulses, those that light it and those that put it out. Both kinds are receivable only from one particular substation, only in the fourth impulse period, and only after the three impulse supervisory call of that substation has been sent. One kind may be given the meaning that track relay #1 is energized and the other that it is deenergized.

Since for each one of these two kinds of reports about track relay #1 there are three different actual impulses differing by the potential they place on wire 28″, it is clear that the potentials on wire 28″ may be used to indicate any other three conditions at the substation, independent of the track relay. Such may be: track switch "normal," "unlocked," or "reverse". Via contacts 28—4 and 6a—14 and wire 55a′, as traced, the potentials of wire 28″ are extended to junction point 55a of indicator circuit 55a″. From this point one relay 17a is branched to + battery with a relatively high resistance 15a in series and another relay 18a is branched to − battery with an equal resistance 16a in series. Two relatively low resistances 41a and 42a also branch from this point 55a to + and − battery respectively, but their circuits are only closed through the back contacts of relays 17a and 18a respectively.

In operation, relays 17a and 18a are never both deenergized; they may be both energized or either one alone may be energized. Whatever their condition, if wire 28″ is made + (impulses Nos. 7 or 8) relay 17a and resistance 15a will be shorted and the relay will fall (if up), while relay 18a will be operated by the following circuit; − battery, winding of relay 18a, resistance 16a, junction 55a and to + battery as already traced. When relay 17a fell it completed by its back contact a circuit from + battery through low resistance 41a to junction 55a. As long as junction 55a is + no current flows in this low resistance circuit, or through relay 17a. When wiper 28′ leaves contact 28—4, junction 55a is cut off from + battery, and current flows in parallel through relay 17a plus resistance 15a and through resistance 41a, then in series through resistance 16a and relay 18a. This current holds up relay 18a as the parallel circuits mentioned amount to a quite low resistance. Of the total flow the greater part takes the path through resistance 41a, so that the current through resistance 41a and relay 15a is insufficient to operate the latter.

If wire 28″ and hence junction 55a are —, the operation is exactly as just described except that it is relay 17a that operates and locks up, and relay 18a that releases and so heavily shunts itself by the low resistance 42a that it does not operate in series with 17a.

If, now, wire 28″ and hence junction 55a are connected to the midpoint of battery 24, junction 55a comes to a potential halfway between + and — of course, and both relays 17a and 18a will be energized. When wiper 28′ passes off contact 28—4 and disconnects wire 55a′ this makes no change in the potential of junction 55a, both relays remaining energized from + battery to — battery in series respectively through resistances 15a and 16a. The circuits of shunt resistances 41a and 42a are, of course, both opened by the energization of both relays. This condition will persist until junction 55a is again made + or — via circuits already traced. Lower contacts of relays 17a and 18a cooperate, as is obvious, to light selectively lamp 43a, lamp 44a or lamp 45a according as relays 17a and 18a are both operated, 18a operated with 17a deenergized or 17a operated with 18a deenergized. These lighted lamps may for instance, mean respectively track switch "unlocked," "normal" and "reversed".

With the assumed meanings of lamp 46a and of lamps 43a, 44a, and 45a the following becomes the meaning of the various report impulses sendable by a substation in the fourth period:

| Impulse | Lamps lit | Track switch | Lamp 46a | Track relay #1 |
|---|---|---|---|---|
| 7 | 44a | normal | lit | energized. |
| 8 | 44a | do | out | deenergized. |
| 9 | 43a | unlocked | lit | energized. |
| 10 | 43a | do | out | deenergized. |
| 11 | 45a | reversed | lit | energized. |
| 12 | 45a | do | out | deenergized. |

These are arbitrary meanings, given only for illustration. Lamp 46a lit might equally well mean track relay deenergized, and hence "block occupied". Any one of lamps 43a, 44a, 45a may, instead, be assigned to mean trackside signals set for "eastbound proceed", "stop" or "westbound proceed".

In the fifth impulse period, as stated above, another set of indicator circuits like 19a″ and 55a″ may be connected through contacts 6a—15 and 6a—13 respectively, and used to record reports, say, of the condition of track relay #2 and of either a track switch or a set of trackside signals.

Wiper 7′, normally stopped by a cam on shaft S, is frictionally held on its own shaft and may be manually moved at once to any contact by the despatcher. This deenergizes the particular relay 6a, 6b, etc., that may be up at that instant and energizes the one corresponding to that contact of switch 7 to which he moves wiper 7″. In this way the dispatcher may cause the supervisory call of any desired substation to be sent out at once and may receive its report signals without waiting for the completion of the automatic cycle. For supervision, i. e. obtaining reports, this facility would however, rarely be used. On occasion this ability instantly to call a substation out of turn may be useful for sending the control calls and controlling impulses about to be described.

*Phase (3)*.—The control call for each substation is conveniently, and as shown in Fig. 3, so chosen that it differs from the supervisory call of that substation only in using a different third impulse. This is, however, a mere matter of convenience. Of the 6×6×6=216 or 6×6×5=180 different substation calls outlined above as possible with three successive impulses on three wires, any two may be chosen as respectively the supervisory and control calls for a given substation. As shown the difference between the supervisory and the control call results from releasing relay 51a by pressing key 52a, thereby opening the locking circuit that passes through front contact 51a—1. Parenthetically, before sending out a control call for any substation, e. g., the a substation, the despatcher must have set the switches 53a and 54a of that substation to send the required controlling impulse right after the control call. The function of these switches will be later described,—the present point is that the release of a particular relay 51a or 51b, etc., by its key 52a or 52b, etc., alters the supervisory call of the corresponding substation to its control call, which must never be done until the control impulse sending device has been set as desired, since some control impulse automatically goes out immediately after the control call. Resuming consideration of the control call itself, in the particular embodiment disclosed and for the particular substation, a, of Fig. 3A, the third impulse of the a supervisory call was above seen to be 0, —, +, i. e., 0 current in line 11, — current in line 12 and + in line 13. It is 0 in line 11 because there is no potential on contact 6a—2 to which wiper 25′ connects line 11 in the third impulse period. By releasing relay 51a it is seen that contact 51a—4 puts + battery on contact 6a—2 and hence on contact 25—3, (causing downward flow in line 11) changing the third impulse of the call from 0, —, +, to —, —, + in lines 11, 12 and 13 respectively.

It must be assumed, as will later be shown, that the called substation will respond to this altered call by preparing to receive and to act upon a controlling impulse sent from the control station in the fourth period, instead of by sending back report impulses in the fourth and fifth periods.

*Phase (4)*.—The controlling impulse, as stated herein before may be any of Nos. 7 to 12. What it actually is depends upon the battery connections made to lines 11, 12 and 13 by wipers 25′, 26′ and 27′ as they pass over contacts 25—4, 26—4, 27—4. These contacts are connected, through contacts 6a—1, 6a—5 and 6a—9, respectively, to contacts 51a—5, 51a—3 and 51a—2, which are now closed since relay 51a was unlocked by key 52a. Wires 53a′ and 53a″ connect contacts 51a—3 and 51a—2 to the upper and lower levers of double throw two pole switch 53a. Wire 54a′ connects contact 51a—5 to the second brush from the top of commutator switch 54a. The latter, which is shown in development, is a small rotary drum type commutator or pole changer with three positions A, B, and C and ten brushes, and turned by knob 54a″. Any equivalent device for altering circuit connections may be substituted. In the positions shown of both switches + battery from the top brush of 54a is on wire 54a′. Wire 53a′ is dead. — battery from the seventh brush of 54a is on wire 53a″. This brings +, 0 and — potentials respectively to lines 11, 12 and 13 as wipers 25', 26' and 27' touch their fourth contacts. By the convention this gives — current in line 11, 0 in line 12 and + current in line 13. Referring to the impulse table this is impulse No. 11.

By throwing switch 54a to the B position wire 54a' is made dead, wire 53a' is made —, wire 53a'' is made +. This gives 0, + and — current in lines 11, 12, and 13, which is impulse No. 9. Similarly it will be found that switch 54a in position C gives impulse No. 7. If we now throw switch 53a to its lower position we find we get impulses Nos. 12, 10, and 8 corresponding again to positions A, B, and C, of switch 54a. Thus by setting the two switches we are able to determine the sending as a fourth impulse of any desired one of impulses numbers 7 to 12. As will later be seen the impulses 11, 9, and 7 sendable when switch 53a is as shown, i. e., toward the side marked N, may all be used to control the track switch at the cooperating substation to assume its "normal" position. The other three impulses, Nos. 12, 10 and 8, sendable when switch 53a is down, or toward the side marked R, may all conveniently be used to cause the track switch to go to "reversed" position. Due to time of shifting, and accidents, a track switch may actually be found and reported in one of three conditions, namely "normal", "unlocked" (i. e. moving or possibly stuck) and "reversed". There is, however, never occasion to control it to move into other than the two positions, namely "normal" and "reversed". This explains the need of three different reports for a track switch with only two different controls.

The two control impulses sendable with switch 54a at position A may both conveniently be used to cause a trackside signal setting for "proceed east bound". The two sendable with 54a at B may both set signals for "stop". The two sendable with 54a at C may set signals for "proceed west bound". Thus, with my preferred choice of impulses, the despatcher may independently control a track switch by setting 53a and a set of signals by setting 54a.

Clearly relay 51a, when unlocked by key 52a to send the control call of substation a and to send thereafter the desired controlling impulse as just described, must be energized and locked up again before the cycle of calls again comes to substation a, i. e. before wiper 7' of switch 7 gets around again to contact 7a. This is conveniently done by connecting the upper or operating winding of relay 51a to any contact of switch 7 that is passed over by wiper 7' after leaving contact 7a and before again getting around to it. In the drawings the operating winding of relay 51a is shown connected by wire 6b' (leading also to relay 6b) and by branch wire 51a' to contact 7b. Thus as wiper 7' comes on contact 7b and energizes relay 6b to send the characteristic call of substation b it also energizes the operating coil of relay 51a. The latter, if deenergized by key 52a, then pulls up and locks itself up by its contact 51a—1 and its lower winding, ready to be deenergized again by key 52a the next time the control call of substation a is sent. Similarly relay 51b corresponding to substation b is energized on contact 7c in parallel with relay 6c, etc., etc., completing the circle, the last relay, 51f, is (as shown) energized by wire 51f' branching from wire 6a' by which relay 6a is energized.

The contacts 51a—6 and 51a—7 are optional, as suggested by the enclosing dotted circles. The control station line relay pairs 21A and B, 22A and B not only respond to report impulses coming from a called substation but also to the impulses sent out from the control station. The first three contacts of dial switches 28 and 29, being dead, prevent any effect on indicator circuits 19a'' and 55a'' of the three impulse supervisory calls or control calls that are sent out. When, however, a controlling impulse, e. g., for substation a, goes out in the fourth period wipers 28' and 29' will be on contacts 28—4 and 29—4, which are not dead, but lead by wires 55a' and 19a' to indicator circuits 55a'' and 19a''. If wires 55a' and 19a' are not interrupted, false indications may result on the various lamps corresponding to substation a. This is of no import practically since the despatcher knew the substation conditions just before he pressed key 52a, knows that he is sending a controlling impulse, and knows that in less than a cycle, i. e., within 10 seconds or so, the correct indications will again be continuously shown, including indications of any changes his controlling impulse has caused. If desired, however, by adding to relay 51a the two contacts 51a—6 and 51a—7 wires 55a' and 19a' will be opened whenever a control call and a controlling impulse are sent, thus preventing even a temporary effect on the lamps of the controlling impulse.

*Substation.*—The operation of a substation, that one that I have designated a and which corresponds to the individual apparatus shown in Fig. 3, will next be described. Fig. 3a shows in detail the circuits of substation a. This operation may best be considered in four phases:

(1) The reception of a supervisory call;
(2) The responsive sending out of the two report impulses;
(3) The reception of a control call;
(4) The reception of a controlling impulse after a control call.

*Phase (1).*—As was shown in detail the supervisory call sent by the control station apparatus for cooperation with substation a comprised impulse #1 as marker followed by impulses #11 and then #10. According to the convention, i. e., in terms of current in lines 11, 12, and 13, this call may be expressed thus: 1st + — +; 2nd — 0 +; 3rd, 0 — +. At the substation, instead of such three-contact polarized line relays as are shown in Fig. 1, or the pairs of two-contact polarized line relays shown at the control station, I have used an equivalent but more inexpensive arrangement of one two-contact polarized relay and one neutral relay in series in each line in which three different current conditions have to be determined. (For this particular substation it happens that my choice of call impulses is such that only two conditions in line 13 need to be determined, and hence the neutral relay therein may be saved.) The use of cheaper line relays at the substations is desirable because there are so many, and is possible because they only have to respond to impulses from the high voltage control station battery. In line 11 relay 31A is a centrally biased polarized relay. Its armature moves right on plus current and left on minus current, and returns to center on 0 current. Relay 31B is an ordinary fairly sensitive relay with one back contact which it opens on current of either kind in the line. The armature of 31A is permanently connected to the positive pole of a local battery 34, which may be the same as used for operation of local railroad apparatus. The armature of relay 31B, through its back contact, is also connected to plus battery. Thus if 0 current is in line 11 the armature of relay 31B supplies a plus potential to wire 58 connected thereto. If plus current is in line 11, 31B opens its contact and disconnects wire 58 from plus battery, but 31A applies plus battery to its right-hand contact and to wire 57. If minus current is in line 11, 31A applies plus battery to its left contact and to wire 59. Thus one of wires 57, 58 and 59 is selectively connected to plus of local battery 34 according as line 11 carries +, 0 or − current.

It is seen that the connections of relays 32A and 32B in line 12 are similar, selectively connecting wires 67, 68, and 69 to minus local battery (instead of plus) according as current in line 12 is +, 0 or −. As will shortly appear local relays 61, 62, etc., are variously connected between one of the group of wires 57, 58, and 59 and one of the group 67, 68 and 69, whereby the selective wetting of one wire of each group selectively operates these local relays.

According to choice of impulses for substation calls certain substations might require a pair of relays like 32A and 32B in line 13. As I have chosen them, however, in this preferred showing, there is never required in line 13 at any one substation means to distinguish between three current conditions, but only means to distinguish one current condition from the other two. At the group of substations that includes substation *a*, there is only one polarized relay, 33, in line 13, having one contact that is closed when there is plus current and that is open otherwise. At other substations the corresponding relay to 33 will be a polarized relay, required to close one contact, only if current in line 13 is minus. At still others it will be a neutral relay required to close a contact only if current in line 13 is 0, and to open the contact otherwise. The resistance of the relay in line 13 at each substation is preferably made equal to that of the pairs like 31A plus 31B and 32A plus 32B; or a special resistance coil may be inserted in line 13 in order to get symmetrical current distribution in the lines.

Reverting to the specific substation shown, when there is plus current in line 13, relay 33 connects wire 69 to wire 70. Wire 69, it was seen, is connected to the local battery (namely, the minus pole thereof), only on the left contact of relay 32A, i. e., only when minus current is in line 12. Thus line 70 is connected to battery (the minus pole) only when there is plus current in line 13 and minus current in line 12. The upper or operating winding of relay 61 is connected between wire 70 and wire 57. The latter, it will be recalled, is connected to plus battery when there is plus current in line 11. Thus, on the particular first impulse (plus-minus-plus) sent by the individual apparatus of Fig. 3, relay 61 is energized between wire 70 at minus battery potential and wire 57 at plus battery potential.

During the interval of no current in all lines, when wipers 25′, 26′ and 27′ are between their first and second contacts, relay 61 is held up by the following circuit: from plus battery, through back contact of neutral line relay 31B, wire 58, wire 58′, its own upper front contact, its lower or holding winding, wire 68′, rectifier or one-way contact 93—1, wire 68, back contact of neutral line relay 32B to minus battery. Relay 61 is materially slower than the line relays, especially in releasing, and is therefore unable to fall and open its own holding contact before relays 31B and 32B close their back contacts to establish the holding circuit just traced.

Through its lower contact relay 61, being now operated, prepares a circuit by which, if the correct second impulse for this substation follows, relay 62 is next energized. The correct second impulse of the supervisory call for substation *a*, sent by the apparatus of Fig. 3, it was seen, is −, 0, +, current in lines 11, 12, and 13. The line relays, on this combination, connect wire 59 to plus battery and connect wire 68 to minus battery, as described. Current therefore flows from plus battery through wire 59, wire 59′, lower contact of relay 61, rectifier 93—2, wire 62′, upper or operating winding of relay 62, wires 62″ and 68′ and rectifier 93—1 to wire 68 and minus battery. Relay 62 operates. Relay 62, once it is operated, by its own second or middle contact and wire 59″, maintains a current path from wire 59 through its own upper winding during the balance of the second impulse, so that it is not de-energized when relay 61 falls back as the latter must do sometime in this impulse. By its upper contact relay 62 also closes a holding circuit, effective during the next interval of no line current, from plus battery, back contact of relay 31B, wires 58 and 58″, upper contact and lower winding of relay 62, wires 62″ and 68′, rectifier 93—1, wire 68 to minus battery on the back contact of relay 32B. Like relay 61, relay 62 is too slow in releasing to open its front contact before line relays 31A and 31B close their back contacts. It is understood that relays 61, 62 ... 65 are not only somewhat slow in releasing but considerably quicker in operating than in releasing. During the second impulse just described current ceases in the holding winding of relay 61, the holding circuit previously traced being opened at the contact of relay 31B, but these relays being of a type and adjustment much quicker in operating than in releasing, relay 61 holds its lower contact closed until relay 62 is operated by the path described. These relays, though of quick-acting slow-release type, must not, however, be so slow in releasing as to hold up during a full current impulse in the lines. In the best adjustment they will hold up during one half thereof.

The third impulse of the supervisory call sent from the control station, as was above seen, is 0, − and + current in lines 11, 12 and 13. The line relays connect wire 58 to plus battery and wire 69 to minus battery during this impulse. (Wire 70, incidentally, is again connected to wire 69 and hence to minus battery, just as on the first impulse, but since the current in line 11 is 0, the contacts of relay 31A are open and the circuit through the upper winding of relay 61 is not this time completed.) Current thus flows during this third impulse from wire 58 (plus) through rectifier 93—3, wire 63′, winding of relay 63, wire 63″, lower contact of relay 62, wire 69′ to wire 69 (minus). Relay 63 operates before contact of relay 62 opens, and is held operated during the balance of the impulse after relay 62 falls via wire 69″ and its own top contact, instead of via wire 63″ and contact of relay 62. Its middle contact completes a circuit from plus battery through wire 90 and upper winding of relay 66 to minus battery. Relay 66 therefore operates immediately after relay 63, during the third impulse, and locks itself in operated position by the following circuit: from plus battery, through its own lower winding and its upper contact, through wire 77 and back contact of relay 38 to minus battery. At the same time relay 66 at its lower contact opens a normally closed circuit from plus battery through wire 39 and winding of vibrating relay 60 to minus battery. However, a branch 39' of wire 39 goes to plus battery on the lower contact of relay 63, so that relay 60 is not actually released until relay 63 releases at the end of the third impulse.

It is readily seen that when any but this particular sequence of impulses, + — +, — 0 +, 0 — +, are received by the line relays of substation *a*, either relay 61 or relay 62 or relay 63 fails to be operated. The operation of 61 is necessary to the operation of 62, and the latter to the operation of 63 and 66. As about to be described it is only when relay 66 is operated (and after relay 63 falls), that normally energized vibrating relay 60 is released and sends out the report impulses. Thus the substation cannot respond unless relays 61, 62, and 63 are operated by the one correct call or sequence of three impulses. At any other substation, e. g., *b*, the individual connections of relays 61, 62, and 63 between one of wires 57, 58, and 59 (selectively made plus by the line relays) and one of wires 67, 68, and 69 (selectively made minus), will be different, so that each substation is adapted to energize its relay 63 (and hence 66) only on receipt of one particular sequence of three impulses.

Before considering the next operation phase the utility of rectifiers 93—1, 93—2, etc. may be explained. As described, each impulse results in a positive battery connection to only one of wires 57, 58, and 59, and a negative battery connection to only one of wires 67, 68, and 69. Consequently, only such local relays receive full voltage as are connected between the particular two wires which are connected to the battery. But certain indirect or so called "back-up" circuits can be traced from positive battery to negative battery through three or more relay coils in series. For example, at an instant when relay 64 has just operated and relay 62 has not yet fallen, certain circuits may be closed between the positive group of wires 57, 58, 59 and the negative group 67, 68, 69, through the holding coil of relay 62 and the operating coils of relays 62, 63, 64 and 65. We may thus, for example, trace a back-up circuit from wire 58 through the coils of relays 63 and 64 to wire 59, and thence through relay 62 to wire 68. If these three relays are operable in series by the battery potential, they could improperly be energized during the interval of zero current in the lines when wires 58 and 68 are connected to positive and negative battery. No improper operation will result if the relays are so adjusted that with three in series none can be operated by the local battery voltage. However, I prefer to block the series circuit by one-way contact devices or rectifiers. It should be noted that the series circuit described passed from relay 64 to wire 59, or in a direction opposite to the normal course of operating current from wire 59 to relay 64. Hence the rectifier 93—4 connected as indicated will effectively block the back-up circuit but will not oppose the normal flow of operating current through the coil of relay 64. Various other back-up circuits can be traced from one or another positive wire, when energized, to one or another of the three negative wires. But in every case such circuit involves reversal of the normal current flow through one of relays 62, 63, 64 or 65. The rectifiers 93—1, etc., placed in the circuit as shown, block all such back-up circuits.

*Phase (2).*—The sending of report impulses from the substation. These impulses are controlled for time by vibrating relay 60 and for character by the positions of relay 53A and switch 54A in the fourth period and by the positions of relay 53B and switch 54B in the fifth period.

Vibrating or pendulum relay 60 comprises an armature 60' and a weight 60" carried on a vibratable reed suitably connected to operate four moving contact members, sub-numbered 1 to 4, having stationary contacts as shown. The natural period of the vibratable reed is such that one double beat or one complete cycle occupies substantially one full impulse period as measured from the start of one line impulse to the next; which time it will be recalled is determined by the speed of shaft S in Fig. 3.

Contacts 60—2, 60—3 and 60—4 of relay 60 are closed at mid-stroke, i. e. one quarter of an impulse period after release of armature 60', and are broken also at mid stroke, i. e., three quarters of an impulse period after release. Contact 60—1 is also adjusted to be both broken and made as nearly as possible at mid-stroke. The actual duration of line current in any impulse and the dead interval before the next impulse starts are preferably about equal. The best adjustment of relays 61—65 being such as to release in one half of the line current duration, or in one quarter of the full impulse period, counting from the end of line current in the third impulse relay 63 by its lower contact releases relay 60 and the latter thereafter completes one half beat in time to operate its contacts substantially at the start of the fourth impulse period. In other words an impulse to be placed on the lines as will be seen, by the back contacts of vibrating relay 60, will be substantially in step with the arrival of wipers 28' and 29' on their fourth contacts. Also, one cycle later of relay 60, wipers 28' and 29' will be nearly enough coming onto their fifth contacts just as relay 60 again closes its back contacts. It is in fact the function of vibrating relay 60 to maintain, for the brief time of two report impulse periods, i. e., for two double beats, an operative synchronism between the placing of report impulses on the lines and the contact closures of the dial switch at the control station.

As relay 60 vibrates contact 60—1 alternately connects the plus pole of local battery 34 to wires 79 and 78. During the last half of the first down swing of armature 60' and the first half of its up swing current flows from plus battery through wire 79, the left winding of relay 35, wire 77 and back contact of relay 38 to minus battery. Relay 35 operates, locking itself up from plus battery by its own nearer front contact and its right winding through wire 77 and contact of relay 38 to minus battery. The farther contact of relay 35 has now connected wire 78, through wire 78" and left winding of relay 36 to wire 77 and minus battery; so that in the last half of the up swing and the first half of the next down swing of armature 60' contact 60—1 closes the circuit of relay 36 and operates the latter. Relay 36 locks itself up from plus battery by its nearer contact 36—1, through its right winding, wire 77 and contact of relay 38 to minus battery. In like manner relay 37 operates, when armature 60' is next below mid point, from plus battery, via contact 60—1, wire 79, branch wire 79', contact 36—5, left coil of relay 37, wire 77, contact of relay 38 to minus battery.

Relay 38 operates, when armature 60' is next above mid point via wires 78, 78', right hand contact of relay 37, coil of relay 38, back contact of 38 to minus battery. The operation of relay 38 cuts off minus battery from wire 77 so that relays 35 to 38 and 66 fall. Relay 38 is adjusted for rather slower release than the others lest any of the others fail to open their holding contacts before 38 itself can fall and reconnect minus battery to wire 77. Release of relay 66 restores the connection of wire 39 to plus battery and reenergizes relay 60, to remain so until again released and started vibrating by the operation of relay 66 and the fall of 63.

Contacts 60—4, 60—3, and 60—2, when closed, connect lines 11, 12 and 13 respectively to wires 60'—4, 60'—3, and 60'—2. Their first closure is in the first down and up swing of relay 60, coinciding, as pointed out above, with the fourth contact closure of the control station dial switches 28 and 29. Relay 36 is not yet operated, and these wires therefore extend through back contacts 36—2, 36—3 and 36—4 and wires 54A', 53A', and 53A'' to the second wiper of report switch 54A and to the moving contacts of report relay 53A.

The second closure of contacts 60—4, 60—3 and 60—2 is in the second down and up swing of relay 60, coinciding with the fifth contact closure of dial switches 28 and 29. Relay 36 is operated at this time and the wires 60'—4, 60'—3 and 60'—2 are extended through the front contacts 36—2, 36—3 and 36—4 and wires 54B', 53B' and 53B'' to corresponding points of report switch 54B and report relay 53B.

Report switches 54A and 54B are shown (in development) as drum pole changers of type exactly like 54a in Fig. 3. Any well known form of circuit changer having three conditions or positions, in each position making the +, — and 0 connections shown, may equally well be used. In practice report switch 54A may be the drum type pole changer shown, mechanically actuated by a power track switch machine so as to show by its three positions A, B, C, the three conditions of a track switch. Report switch 54B may in practice be replaced by suitable contacts in the controller of a set of semaphore type signals, or by contacts made and broken on the relays that operate a set of trackside signal lights, these connections in either case being arranged to make the indicated +, — and dead local battery connections for the three different semaphore or signal light conditions.

Report relays 53A and 53B may be either the two track relays themselves or may be operated by the two track relays, whose operated or non-operated positions are to be reported. Their contacts are functionally equivalent to those of switch 53a at the control station.

In connection with track relays 53A and 53B, it is assumed that the associated track circuits are of such length that no train can enter and leave the track section in the brief interval between two successive supervisory signals at the substation, otherwise the train would pass the indicating point without causing any report to be transmitted to the control station. If conditions are such that this might otherwise occur, relays 53A and 53B should have a slow pick-up characteristic, or other means should be provided to insure that the relays once released will not pick up before their release has been signalled to the control station.

In the fourth impulse time, report switch 54A and report relay 53A, and in the fifth impulse time, report switch 54B and report relay 53B determine which impulse of numbers 7 to 12 is sent. Tracing the conditions actually shown, when relay 60 is released and contacts 60—4, 60—3 and 60—2 first close it is seen that line 11 will be connected to the — pole of the local battery 34 by wire 60'—4, back contact 36—2, wire 54A', second wiper of report switch 54A, the adjacent conducting segment and the bottom wiper. At the same time line 12 will connect by contact 60—3 to wire 60'—3 which leads via back contact 36—3, wire 53A', lower contact of relay 53A, and fourth wiper of report switch 54A to insulation. Line 13 will connect by contact 60—2, wire 60'—2, back contact 36—4, wire 53A'', upper contact of relay 53A, fourth wiper from top of switch 54A, conducting segment adjacent, and third contact from top, to plus battery. Since substation a is shown below the control station these battery connections respectively cause downward or, per convention, minus current in line 11, 0 current in line 12 and upward or + current in line 13. This is impulse number 11 of the table.

Tracing the local battery connections to the three lines that may similarly be made both in the fourth and in the fifth impulses, when report switches 54A and 54B are in their "A", "B" or "C" positions and when report relays 53A and 53B are either operated or not, we find that for either impulse period any one of impulses numbers 7–12 may be put in the lines.

It will be understood that the meanings assigned to these impulses, i. e., the particular combination of a track relay position with a track switch or a trackside signal position that each impulse represents, may be more or less arbitrary provided they agree with the meanings assigned to the various arrangements of lighted and unlighted lamps in indicating circuits 19a'' and 55a'' at control station. Suitable assignments of report impulse meanings have been suggested above when describing their reception at the control station. For example in the tabular arrangement thereabove given will be found that a number 11 impulse received in the fourth period (which we have just seen is the one sent out by substation a as the parts are shown) will light lamps 45a and 46a, and that these may have the meaning "track switch is normal with track relay No. 1 energized".

Before passing to the reception of the control call the possibility of a modification making somewhat more extended use of vibrator 60 may be pointed out. It will be noted that the vibrator 60 and associated relays 35 to 38 constitute in effect a timer or distributor operating in approximate but workable synchronism with the control station dial switches during the two impulse periods used to transmit report impulses from the substation. It is readily seen that the whole group of five impulses which constitutes the supervisory call with the report impulses or the control call with the controlling impulse, could be timed at the substation by a vibrator like 60 and a counting relay chain similar to relays 35 to 38, but arranged to run for four impulse periods instead of two.

In such an arrangement the vibrator would start at the end of the first, or marker impulse. Each of the call receiving relays 61 to 64 would be dependent on a relay of the counting chain and also dependent on the combination of currents flowing in the lines; so that it could be picked up only during a particular one of the five consecutive impulses, and then only by a particular combination of line currents. If the three combinations constituting the supervisory or control call were received in the right time sequence, circuits would be set up to transmit a supervisory signal or receive a control signal as in Fig. 3.

*Phase (3).*—The reception of the control call is exactly as described for the supervisory call until the beginning of the third impulse. Thus we may assume relay 62 operated and locked up as already traced until the end of the dead interval after the second call impulse. The third impulse of the control call sent out for substation *a*, as already described under Phase 3 of the control station, was negative current in lines 11 and 12 and positive current in line 13. The line relays at this substation, on this impulse, put plus local battery on wire 59 and minus on wire 69.

Parenthetically, wire 70, by relay 33, is also connected to local battery at the minus pole; but this has no local effect, not even on relay 61 to which 70 leads, because wire 57 is dead. The plus current is in line 13 merely because the minus current in lines 11 and 12 must have a return path. In other words the minus current in lines 11 and 12 conveys the full signaling significance of this impulse, as is the property (already pointed out) of impulses numbers 7 to 12.

With relay 62 operated and with plus on wire 59 and minus on wire 69, current flows via wire 59 through rectifier 93—4, wire 64', winding of relay 64, wire 63", lowest contact of relay 62, wire 69' back to minus by wire 69. Relay 64 operates. Relay 62 shortly falls, opening this circuit at its lowest contact, but relay 64 holds itself operated as long as the line impulse lasts from plus by wire 59, rectifier 93—4, wire 64', its winding and upper contact, wire 64" and wire 69 back to minus battery.

At the end of the third impulse, and before relay 64 falls the line relays go to the positions shown and a circuit is established from plus battery on back contact of line relay 31B, via wire 58, rectifier 93—3, wire 65', lower contact of relay 64, winding of relay 65, wire 65", rectifier 93—1, wire 68, contact of relay 32B to minus battery. Relay 65 thus operates at the end of the third impulse. Relay 64 shortly falls but relay 65 is held operated for as long as the line relays stay as shown, i. e., until the next or fourth impulse begins, by the circuit from plus on contact of relay 31B, wire 58, upper contact and winding of 65, wire 65", 93—1, wire 68 back to minus at contact of 32B. Relay 65 is thus found operated, and its lower contact closed, when the fourth or controlling impulse begins.

Before describing the result of the controlling impulse about to be received it may be observed that each of the relays 61 and 62 is energized only for the duration of the impulse which picked it up and the succeeding interval between impulses, and relays 63 and 64 only for the duration of the impulse. Furthermore, each relay beyond 61 is energized only if its appropriate impulse is received before the preceding relay has had time to drop. Hence, the third relay, 63 or 64, can be picked up by one and only one sequence of three successive impulses. But the same impulse combination should not be repeated in two consecutive impulses, such as the second and the third; for relay 63 or 64 would then respond to the same combination as relay 62; and if the relays operate very rapidly, 62 and 63 or 64 might pick up successively during the single impulse intended for relay 62. The same limitation does not apply to relays 71 to 76, for they are dependent upon relay 65 which closes only after the last preceding impulse has ceased.

*Phase (4).*—Reverting to the condition at the start of the fourth impulse, with relay 65 operated, we find that wires 57, 58 and 59 lead respectively through relays 71, 72, and 73 with attendant rectifiers 93—5, 93—6 and 93—7, through their common wire 88, lower contacts of relay 65 and wire 89, thence through one of relays 74, 75, and 76 to wires respectively 68, 67, and 69. As we have already seen, impulse numbers 7 to 12 of the table will connect selectively wires 57, 58 and 59 to plus battery and wires 67, 68 and 69 selectively to minus battery. Whichever of these six controlling impulses is therefore received will establish one circuit, and one only, through one of relays 71, 72 and 73 in series with one of relays 74, 75, and 76. Which of relays 71, 72, and 73 is operated depends on the current in line 11; which of relays 74, 75, and 76 depends on the current in line 12. Since these six controlling impulses (see table) comprise plus current in line 11 with either plus or 0 in line 12, 0 in line 11 with either plus or minus in line 12, and minus in line 11 with either 0 or — in line 12, we may have relay 71 operated with either relay 75 or 74, we may have relay 72 operated with either relay 75 or 76, we may have relay 73 operated with either relay 74 or 76. The arrows leading from the contacts of these relays and designated A, B, C, and N, R, represent control wires leading to the operating elements of track side signal groups and of a track switch machine. For a single example, the operation of relay 71 with relay 74 will put plus battery on control wires C and R. Using the assignment of meanings suggested in the discussion of the controlling impulse phase of the control station circuit, this would cause the trackside signals to be set for "proceed west bound" and the track switch to be moved to "reverse".

Figure 4:
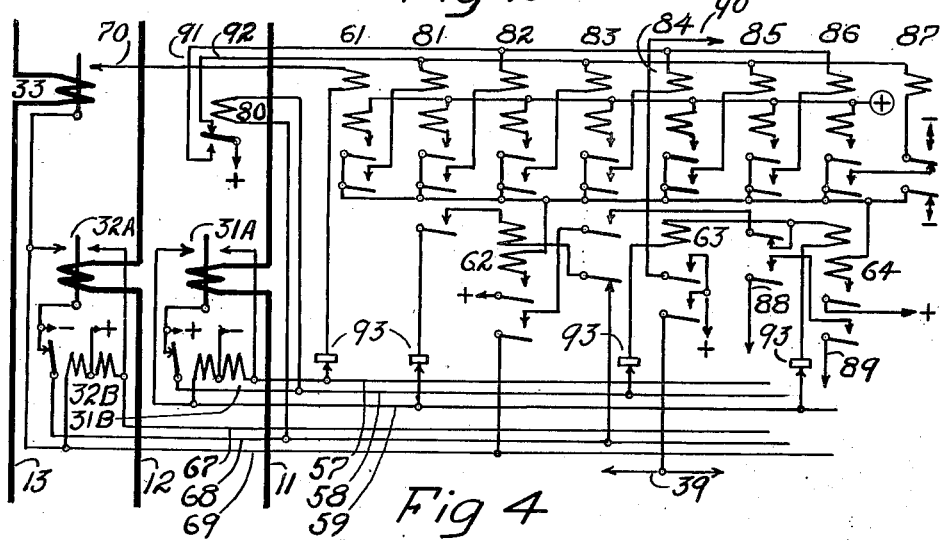
Fig. 4 shows part of the connections at one substation in a modified embodiment.

Fig. 4 shows, very diagrammatically, one modification of the substation circuit just described. In describing the response of the call receiving relays 61 to 65 it was mentioned that the correct response of the relays was dependent upon reasonably suitable time characteristics of the relays. Specifically the releasing time of each relay must be less than one impulse period, but not less than the operating time of the succeeding relay. The attainable speed of reliable operation would be increased if this restriction were removed, i. e. if the receiver were operative even with instantaneous release of the relays. This can be accomplished by the use of certain additional relays. Fig. 4 also incidentally illustrates certain possible modifications of the line relays.

As in Fig. 3a, relays 31A, 32A, and 33 are polar relays biased to the open position and connected in lines 11, 12, and 13 respectively. The series neutral relays 31B and 32B of Fig. 3 are replaced by local relays, which are identified by the same reference characters, each having two coils, one or the other of which is energized at either energized position of the associated polar relay. Thus, as in Fig. 3, polar relay 31A connects wire 57 or 59 respectively to positive battery when positive or negative current flows in line 11; and relay 31B connects wire 58 to positive battery when the line current is zero. In like manner relays 32A and 32B connect line 67, 68, or 69 to negative battery according as current is positive, zero, or negative in line 12.

80 is an additional local relay having its coil connected between wires 58 and 68. It is therefore energized during the intervals between line impulses, i. e., when current is zero in both lines 11 and 12. This relay connects positive battery alternately to wires 91 and 92; to 91 during each current impulse in the line conductors and to 92 during each interval between impulses.

The connections shown are adapted for response to the calls described for substation a, viz:

|  | Line 11 | Line 12 | Line 13 |
|---|---|---|---|
| First impulse | + | — | + |
| Second impulse | + | 0 | + |
| Third impulse—supervisory call | 0 | — | + |
| Third impulse—control call | — | — | + |

Relays 61 to 64 are connected for response to these impulse combinations as in Fig. 3; i. e., their operating circuits are connected respectively between wires 57 and 70, wires 59 and 68, wires 58 and 69, and wires 59 and 69. But these operating circuits are dependent upon contacts of relays 81, 83, and 85, with the result (as explained hereafter) that relay 62 can close only during the second impulse of a signal and relay 63 or 64 only during the third impulse. Since each relay is restricted to operation during its proper impulse, repetition of the same impulse in succession is permissible. It will be recalled that such repetitions were barred in connection with Fig. 3a. This permits the operation on three line wires of 216÷2=108 instead of 180÷2=90 substations.

Relays 61 and 81 to 87 constitute a counting chain controlled by the contact reversals of relay 80. The first, or marker impulse operates relay 61. As previously stated the marker impulse is chosen from a group of combinations reserved exclusively for markers; hence relay 61 can operate only on the first impulse of a call. When closed it holds up over a circuit from positive battery through its lower coil and first contact to negative battery at the second contact of relay 87. At the same time its second contact completes a path from wire 92 through the upper, or operating coil of relay 81 to negative battery at relay 87. So long as the first impulse continues relay 80 is deenergized and wire 92 is dead; but when the line impulse ceases relay 80 operates, energizing wire 92 from positive battery. Relay 81 now operates and holds up over the obvious circuit through its lower coil and first contact. In like manner each relay of the chain in closing establishes the operating circuit for the next relay at its right. The latter relay closes at the next reversal of relay 80. Thus relays 61 and 81 respectively operate at the start and finish of the first impulse; 82 and 83 at the start and finish of the second impulse; 84 and 85 at the start and finish of the third impulse; and 86 and 87 at the start and finish of the next impulse that is sent from the control station. During the normal program of supervisory calls and reports this will be the initial impulse of the succeeding substation call; for the substation line relays are not designed to respond to the relatively weak currents which constitute the report impulses sent from the substation. If the call received is a control call instead of a supervisory call, the next impulse sent from the control station is a control impulse in the fourth period, to which relays 86 and 87 will respond. In either case relay 87 will operate before any impulse received over the lines can cause a false response.

When relay 87 operates it breaks the negative battery connection for the holding circuits of all previous relays, which thereupon release. In order to avoid possible vibrator action at relay 87 its operating circuit is transferred to negative battery over its first contact, and the relay remains closed until the next reversal of relay 80, when it drops, completing the restoration of the counting chain to normal position.

At the end of the first line impulse the third contact of relay 81 completes the operating circuit for relay 62. If operated by the appropriate second impulse, the latter relay holds up over an obvious circuit through its first contact and lower coil until the holding circuit is broken as already described at relay 87. At the end of the second impulse the operating circuit is broken at the fourth contact of relay 83. Hence relay 62 can operate only during the second impulse.

Provided relay 62 has operated as described during the second impulse, operation of relay 83 will complete the following circuit: From wire 69 through second contact of relay 62, third contact of relay 83 and back contact of relay 85 to the top of operating coils of relays 63 and 64; thence through the former and a rectifier 93 to wire 58 and through the latter and another rectifier to wire 59. If the third impulse is that of the supervisory call, wires 58 and 69 will be connected to battery and relay 63 will energize. If the third impulse received is that of the control call, wires 59 and 69 will be connected to battery and relay 64 will operate. In the former case wires 39 and 90 are connected to positive battery for the duration of the impulse only. This results in transmission of report impulses as described in connection with Fig. 3a. In the latter case relay 64 holds up over its lower coil until the end of the fourth impulse (when the holding circuit is interrupted at relay 87). At the end of the third impulse the fourth contact of relay 85 establishes a connection from wire 88 through the second contact of relay 64 to wire 89. Relays 71 to 76 (see Fig. 3a) are thereby prepared to receive a control impulse in the fourth period. The operating circuit for relays 63 and 64 is broken by relay 85 at the end of the third impulse. Hence these relays cannot be improperly operated by the fourth impulse instead of the third. As in Fig. 3a the rectifiers 93 block series circuits which would otherwise exist other than the proper operating circuits from positive to negative battery, e. g., from positive battery through the left hand coil of relay 32B, wires 69 and 70, coil of relay 61, wire 57 and right hand coil of relay 31B to negative battery.

One embodiment of this invention has been shown diagrammatically in Fig. 1 and completely in Figs. 3 and 3a. Certain modifications have been shown in Figs. 2 and 4, and other modifications have been described in the specification. Many other modifications which fall within the scope of the invention as defined by the following claims will occur to those skilled in the art.

What I claim is:

1. In a remote control system, three lines, means including a source of current for impressing current of different characteristics simultaneously on each line and means for selecting the impressed current characteristics in accordance with a code involving successive impulses and a combination of current characteristics on each line in each impulse.

2. In a remote control system, more than two stations all connected by three conductors, a source of current, a transmitter at a first station sending a call signal, for one of the other stations, composed of distinctive current combinations on the three conductors in successive impulses, a receiver at the called station responsive to the call signal, an operating unit at the called station, and a transmitter at the called station responsive to said receiver and to said operating unit for transmitting to said first station a report signal, which report signal involves distinctive current combinations in one impulse, to indicate the condition of said operating unit.

3. In a remote control system, a plurality of stations, three conductors interconnecting said stations, a transmitter at a first station sending a call of successive current impulses on combinations of said three conductors, including combinations when no current is sent on certain conductors of each combination, the first impulse of the call being one of several reserved for first impulses of calls, and a receiver at one of the other stations, responsive to the call transmitted from said first station.

4. A remote control system comprising a control station and substations connected by three line conductors, a transmitter for impressing on the three lines alternate groups of one or more impulses of a first class to mark the beginning of a signal and of a second class to complete the signal, the first class selected from one set of current combinations and the second class selected from a different set of current combinations, and receivers responsive to signals initiated by an impulse group of the first class but not responsive to any overlapping group of impulses.

5. A remote control system comprising stations connected by three conductors and signalling devices including a source of current in the stations adapted to communicate one with another in a code characterized by a sequence of impulses and by the presence or absence and polarity of current in certain conductors during each impulse.

6. A remote control system comprising a control station and substations connected by three conductors including means at the control station for transmitting either of two calling codes to each substation, means responsive at a substation to the first code to transmit two supervisory signals, and means responsive at a substation to the second code to receive a control signal indicating a combination of two desired operations.

7. In a remote control system, two stations connected by three conductors only, at least two operating units at one of said stations, and means for transmitting over the conductors in a single impulse a control signal indicating the desired one of three possible operations for one operating unit and the desired one of two possible operations for a second unit.

8. In a remote control system, two stations connected by three conductors only, groups of operating units, and means for transmitting over the conductors in a single impulse a report signal indicating one of three conditions in one operating unit or group and one of two conditions in a second unit.

9. In a remote control system, a control station and substations, operating units at said substations, means including three line conductors for communicating messages between the control station and a substation in a code composed of successive impulses on characteristic combinations of said conductors, each message including a substation call in two impulses to identify a desired substation and a signal in a subsequent impulse to indicate the condition of an operating unit at the called substation.

10. A train dispatching system comprising a control station, and substations connected by three line conductors, a transmitter at the control station automatically sending out a recurrent program of call signals to the substations in rotation, a transmitter at each substation sending a supervisory signal to the control station in response to the substation call signal, and means at the control station for suspending the receipt of a supervisory signal by manual intervention and substituting a control signal to the same substation.

11. In a train dispatching system, a control station and substations communicating over three line wires, operating units at the substations, automatic means for signalling between the control station and each substation in turn in a recurrent program to transmit information concerning operating units at the substations, and manual means for suspending the automatic program for the transmission of signals to specific substations.

12. In a train dispatching system comprising a control station and substations communicating over three line wires, operating units at the substations, indicators at the control station indicating continuously the condition of operating units at substation, and recurrent means for correcting the indications of two indicators at one and the same time and for correcting the indications of all indicators at intervals so short as to be substantially equivalent for practical purposes to continuous supervision.

13. A train dispatching system comprising three lines, stations distributed along the lines, a source of current, and a transmitter for impressing voltage upon the lines at each station, and a receiver at each station including bridging relays responsive to potential differences between the lines two by two.

14. A train dispatching system comprising three lines, stations distributed along the lines, a source of current and a transmitter for impressing voltage upon the lines at each station, and a receiver at each station including electronic relays responsive to potential differences between the lines.

15. A train dispatching system comprising two stations connected by three lines, a source of energy and a transmitter at one station to establish a combination of potentials on the lines, and a receiver at the other station responsive to the combination of potentials on the lines, said receiver including one electronic relay having a filament and grid connected respectively to the first and second lines and another electronic relay having a filament and grid connected respectively to the second and first lines, the two relays producing three distinctive responses according as the first line or the second line or neither is at a higher potential than the other.

16. A train dispatching system comprising a control station and substations connected by three lines, operable units at the substations, a current source and a switch at the control station automatically establishing successive current combinations in the lines to call the substations, a second switch to modify one of the current combinations when a unit at a substation is to be operated, and a third switch co-operating with the first and second switches to select the current combination impressed upon the lines in another impulse in accordance with the operation desired at the substation unit.

17. A train dispatching system comprising a transmitter and two receivers connected by three lines, automatic means in the transmitter for sending a program of successive current combinations over the wires calling each receiver selectively in turn to cause a responsive signal therefrom, manual means to modify the calling combinations for one receiver and thereby to control an operation at the receiver, and automatic means to restore the normal program of current combinations after the modified combinations have been transmitted.

18. In a train dispatching system, three conductors, substations associated therewith and a transmitter comprising a source of current, switches and a distributor whereby groups of impulses constituting call or control signals for successive substations are transmitted over the conductors in a recurrent program, the current combination transmitted being invariable in certain impulses, variable in other impulses for selection as between supervisory or operative response at the substations and variable in other impulses to select particular operations desired at the substations.

19. In a train dispatching system, a control station and substations connected by three lines, selectors at the control station for each substation, a distributor at the control station connecting the lines successively to certain points corresponding to successive impulses of a signal to a substation and a second distributor connecting the points successively to different ones of said selectors corresponding with different substations, the signal transmitted to each substation depending upon certain permanent connections to the second distributor and upon manual operation of the particular selector.

20. In a train dispatching system, three lines connecting a control station to substations, a signal selector for each substation at the control station, a switch at the control station transferring line connections successively to different signal selectors and a second switch establishing connections for successive impulses during connection to one selector.

21. In a train dispatching system, a control station and substations connected by three line wires, signalling units at the control station, one for communication with each substation, and concatenated distributing switches at the control station for associating the signalling units successively with the line wires and for establishing successive impulse periods for each unit.

22. In a train dispatching system comprising a control station and substations connected by three line wires, a source of current, transmitters at the substations for variably applying current from said source to said line wires, a receiver at the control station adapted to give three indications of conditions at the substation selectively according as the current in a first line wire is positive, negative or zero, and a second receiver at the control station responsive jointly to current in the first line wire and in a second line wire to give additional indications.

23. In a train dispatching system comprising a control station and substations connected by three line wires, receivers at the control station, one for each substation for reception of supervisory signals, and concatenated distributing switches for associating the receivers successively with the line wires and for establishing successive impulse periods during the association of each receiver, successive control and report impulse periods being established during each such association.

24. In a train dispatching system comprising a control station and substations connected by three line wires, a receiver at the control station responsive to current combinations in the line wires adapted to respond selectively during a single line impulse to one of three positions of one selector at a substation and to one of two positions of a second selector at a substation.

25. In a train dispatching system, a control station connected by three line wires to a substation, a plurality of units at the substation, and a sender at the substation adapted to transmit during a single line impulse a supervisory signal indicating one of two conditions of one unit and one of three conditions of another unit.

26. In a train dispatching system comprising a control station and a substation connected by three line wires, a receiver at the control station and a receiver at the substation, means at the control station for controlling the receiver at the substation, and a sender located at and responsive to the receiver at the substation for transmitting signal impulses isochronously with said receiver at the control station.

27. In a train dispatching system the sender at the receiving station as described in claim 26 comprising a vibrating relay.

28. In a train dispatching system, stations connected by three line conductors, a source of current, means at each station for variably applying current from said source to the line conductors, a receiver at one station comprising two polar relays responsive to current in one line conductor, the first adjusted to close one contact when the current is positive and another when the current is zero or negative, the second adjusted to close one contact when the current is negative and another when the current is zero or positive, traffic controlling devices at said stations, and three circuits for variably controlling said devices, one of said circuits being selected jointly by the two relays in response to positive, negative, and zero current in the line.

29. In a train dispatching system, stations connected by three line wires, a source of current, means at each station for variably applying current from said source to said line wires, a receiver at one station comprising a polar and a neutral relay, the polar relay actuated by current in one line wire to close one or another circuit when the line current is positive or negative and neither relay actuated when the current is zero, the neutral relay, actuated by local energy through the contacts of the polar relay, being released to close a third circuit when the line current is zero, and traffic controlling devices at said stations variably operated upon the closing and opening of said circuits.

30. In a train dispatching system, stations connected by three line wires, a source of current, means at said stations for variably applying current from said source to said line wires, a pair of local wires at one station, means at said one station for energizing one or the other of said local wires in accordance with current in one line wire, a second pair of local wires, means at said one station for energizing one or the other of said second pair of local wires in accordance with current in another line wire, and a receiving element at said one station responsive only to one combination of energized wires in the first and second pairs.

31. In a train dispatching system, a receiver comprising a battery and a group of wires, a transmitter for sending signals to said receiver, means for connecting said wires selectively one at a time to positive battery in accordance with received signals, a second group of wires, means for connecting the second group of wires in like manner to negative battery, relays each connected from one wire of the first group to one wire of the second group, each constituting a direct path between the groups, a series circuit including two of said relays from a wire of the first group to a wire of the second group, traffic controlling devices variably operated by said relays and series circuits, and a rectifier whereby the series circuit is blocked but the direct paths are not blocked.

32. In a train dispatching system, a source of current, an impulse sender, a receiver responsive to a sequence of distinctive impulses comprising a relay energized during one impulse and the succeeding interval between impulses, and a second relay energized over a contact of the first relay during the next consecutive impulse only, the second relay picking up during the releasing period of the first relay.

33. In a train dispatching system, a source of current, an impulse sender, a receiver responsive to a sequence of successive impulses comprising a relay energized during one impulse, a second relay energized during the release of the first relay in the succeeding interval between impulses and held closed for the duration of the interval, and a third relay energized over a contact of the second relay during the release of the second relay in the next succeeding impulse.

34. In a train dispatching system including stations connected by three conductors, a source of current, an impulse sender, a receiver comprising three relays selectively responsive to three current characteristics in a first conductor during a certain impulse, three other relays selectively responsive to three current characteristics in a second conductor during the same impulse, and local circuits jointly controlled by the first three relays and the second three relays.

35. In a train dispatching system having stations communicating over three conductors in a code involving successive impulses and a distinctive current combination in each impulse, a receiver comprising a counter counting impulses from the start of a signal and a relay responsive during only a certain impulse, as determined by the counter, and responsive only to a certain current combination during that impulse.

36. In a train dispatching system, a receiver as described in claim 35 and automatic means for restoring the counter to normal after the conclusion of a signal.

37. In a train dispatching system, stations communicating over three wires in a code involving two successive distinctive impulses, a receiver at one station comprising a counter responsive to the interval between the impulses, and an element limited thereby to respond during a particular impulse of the code and then responsive only to an impulse of one distinctive character.

38. A train dispatching system comprising a control station and substations connected by three line conductors, traffic controlling units at the substations, manual means at the control station for establishing a code to be transmitted over said three line wires to initiate all desired operations of the traffic controlling units at one substation, and automatic means at the control station for calling the substations in cyclic rotation, each substation only once in each cycle, and for transmitting said code to said one substation when called.

ELI J. BLAKE.

DISCLAIMER 2,098,910.—*Eli J. Blake*, Haddonfield, N. J. REMOTE CONTROL SYSTEM. Patent dated November 9, 1937. Disclaimer filed April 18, 1939, by the assignee, *The Union Switch & Signal Company*.

Hereby disclaims the subject matter of claims 1, 3, 5, 21, 22, 23, 24, 25, 26, 29, 30, 33, 35, 36, and 37 in said patent.

[*Official Gazette May 16, 1939.*]